(12) United States Patent
Charrat et al.

(10) Patent No.: US 8,744,347 B2
(45) Date of Patent: Jun. 3, 2014

(54) METHOD OF ROUTING INCOMING APPLICATION DATA IN AN NFC CHIPSET, FOR IDENTIFICATION OF THE APPLICATION

(75) Inventors: Bruno Charrat, Aix-en-Provence (FR); Philippe Martineau, Fuveau (FR)

(73) Assignee: Inside Secure, Meyreuil (FR)

( * ) Notice: Subject to any disclaimer, the term of this patent is extended or adjusted under 35 U.S.C. 154(b) by 1022 days.

(21) Appl. No.: 12/376,360

(22) PCT Filed: Jul. 11, 2007

(86) PCT No.: PCT/FR2007/001185
§ 371 (c)(1),
(2), (4) Date: Feb. 4, 2009

(87) PCT Pub. No.: WO2008/017745
PCT Pub. Date: Feb. 14, 2008

(65) Prior Publication Data
US 2010/0227553 A1    Sep. 9, 2010

(30) Foreign Application Priority Data

Aug. 4, 2006 (FR) ..................................... 06 07179

(51) Int. Cl.
*H04B 5/00* (2006.01)
(52) U.S. Cl.
USPC ......................................... 455/41.1; 455/41.2
(58) Field of Classification Search
USPC ................. 455/41.1–41.3; 235/375–386, 492; 713/168
See application file for complete search history.

(56) References Cited

U.S. PATENT DOCUMENTS

| | | | |
|---|---|---|---|
| 7,451,258 B1 * | 11/2008 | Hiratzka et al. | 710/111 |
| 8,117,445 B2 * | 2/2012 | Werner et al. | 713/168 |
| 8,260,199 B2 * | 9/2012 | Kowalski | 455/41.1 |
| 2004/0087273 A1 | 5/2004 | Perttila et al. | |
| 2004/0148501 A1 * | 7/2004 | Livaditis et al. | 713/161 |
| 2006/0052055 A1 * | 3/2006 | Rowse et al. | 455/41.1 |
| 2006/0066484 A1 | 3/2006 | Sayers | |

FOREIGN PATENT DOCUMENTS

| | | |
|---|---|---|
| WO | 2004/029860 A1 | 4/2004 |
| WO | 2005/076857 A1 | 8/2005 |

OTHER PUBLICATIONS

"Identification cards—Integrated circuit(s) cards with contacts", International Standard ISO/IEC 7816-1, First Edition (Oct. 15, 1998).

Afnor, "Identification cards—Integrated circuit(s) cards with contacts", International Standard ISO/IEC 7816-1, First Edition (Oct. 15, 1998), Amendment 1 (Nov. 15, 2003).

(Continued)

*Primary Examiner* — Raymond Dean
(74) *Attorney, Agent, or Firm* — Panitch Schwarze Belisario & Nadel LLP

(57) ABSTRACT

A method for routing incoming or outgoing application data in an NFC system includes an NFC interface circuit performing contactless data sending and receiving. The routing of incoming application data received by the interface circuit includes routing at least a first portion of the incoming application data to a destination point located in the NFC system and designated as arbitration point of incoming application data routing; analyzing by the arbitration point the first portion of the incoming application data to identify the application for which the data is sent to the NFC system; designating by the arbitration point a point of destination of the application data and application processing; and routing a second portion of the incoming application data to the destination and processing point.

28 Claims, 10 Drawing Sheets

(56) References Cited

OTHER PUBLICATIONS

Afnor, "Identification cards—Integrated circuit cards", International Standard ISO/IEC 7816-2, First Edition (Mar. 1, 1999), Amendment 1 (Jun. 1, 2004).
Afnor, "Identification cards—Integrated circuit cards", International Standard ISO/IEC 7816-2, Second Edition (Oct. 15, 2007).
Afnor, "Identification cards—Integrated circuit cards", International Standard ISO/IEC 7816-3, Third Edition (Nov. 1, 2006).
"Information technology—Identification cards—Integrated circuit(s) cards with contacts", International Standard ISO/IEC 7816-4, First Edition (Sep. 1, 1995), Amendment 1 (Dec. 15, 1997).
Afnor, "Identification cards—Integrated circuits cards", International Standard ISO/IEC 7816-4, Second Edition (Jan. 15, 2005).
"Identification cards—Integrated circuit(s) cards with contacts", International Standard ISO/IEC 7816-5, First Edition (Jun. 15, 1994), Amendment 1 (Dec. 15, 1996).
Afnor, "Identification cards—Integrated circuit cards", International Standard ISO/IEC 7816-5, Second Edition (Dec. 1, 2004).
Afnor, "Identification cards—Integrated circuit cards", International Standard ISO/IEC 7816-6, Second Edition (May 15, 2004).
Afnor, "Identification cards—Integrated circuit cards", International Standard ISO/IEC 7816-6AC1, (Jun. 15, 2006).
"Identification cards—Integrated circuit(s) cards with contacts", International Standard ISO/IEC 7816-7, First Edition (Mar. 1, 1999).
"Identification cards—Integrated circuit(s) cards with contacts", International Standard ISO/IEC, FDIS, 7816-8, Final Draft (1998).
Afnor, "Identification cards—Integrated circuit(s) cards with contacts", International Standard ISO/IEC, FDIS, 7816-9, (Dec. 21, 1999).
Afnor, "Identification cards—Integrated circuit cards with contacts", International Standard ISO/IEC 7816-15/AC1, (Jul. 1, 2004).
Afnor, "Identification cards—Integrated circuit cards with contacts", International Standard ISO/IEC 7816-15, First Edition, (Jan. 15, 2004).
"Identification cards—Contactless integrated circuit(s) cards—Proximity cards", International Standard ISO/IEC 14443-2, First Edition (Jul. 1, 2001).
Din, "Identification cards—Contactless integrated circuit(s) cards—Proximity cards", International Standard ISO/IEC WD14443-2, (Jan. 26, 2007).
"Identification cards—Contactless integrated circuit(s) cards—Vicinity cards", International Standard ISO/IEC 15693-3, First Edition (Apr. 1, 2001).

\* cited by examiner

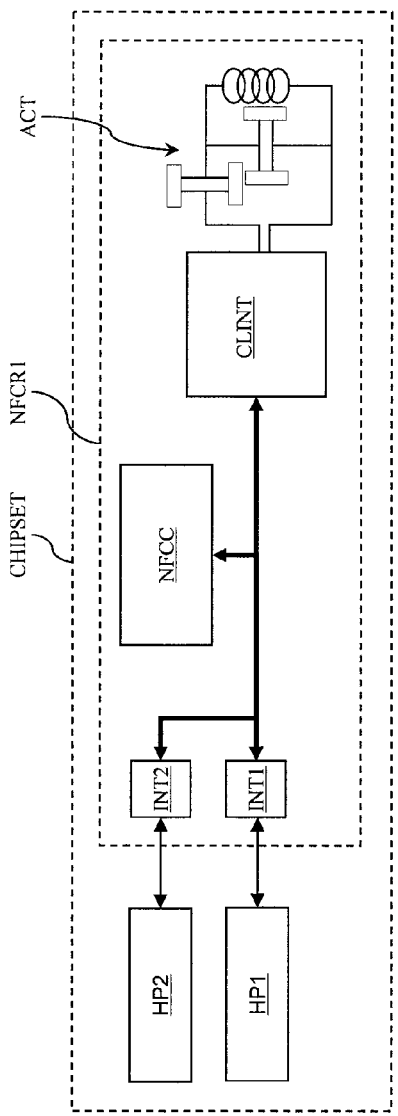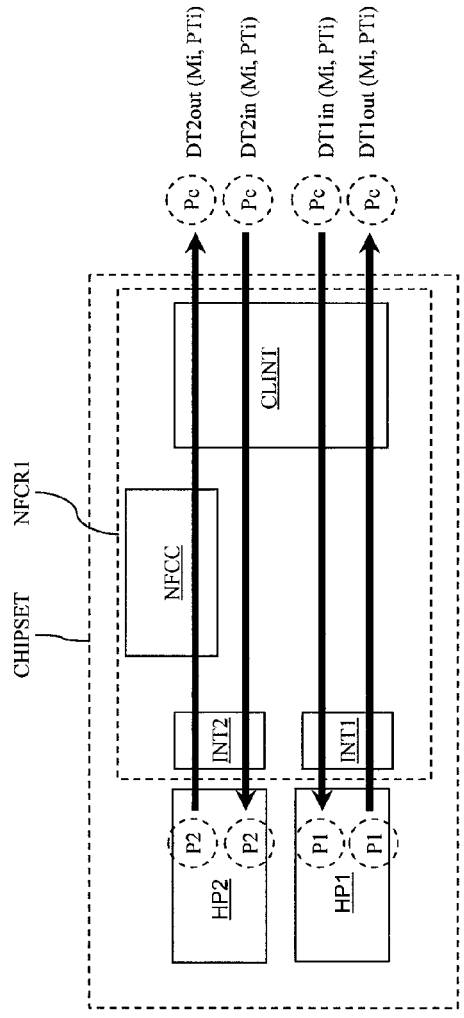
Fig. 3A
Fig. 3B

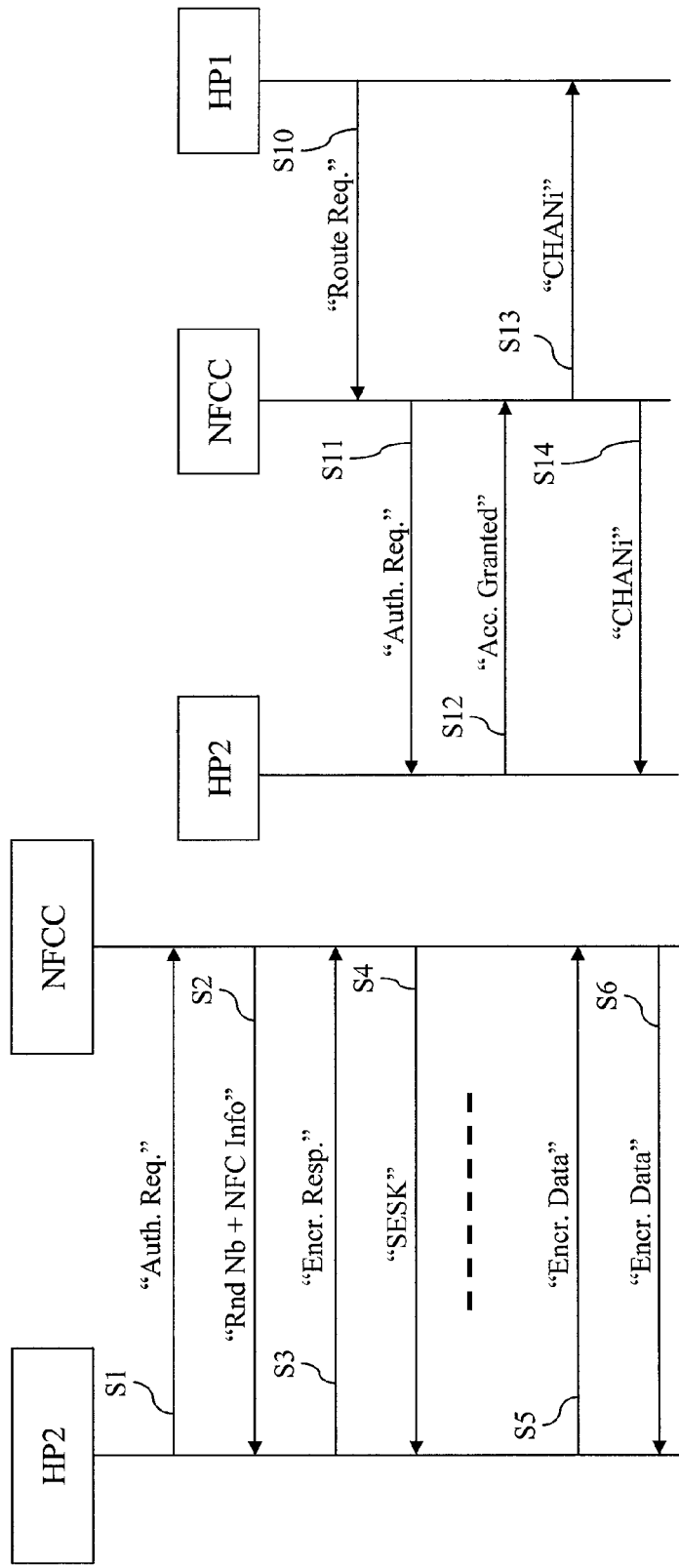

METHOD OF ROUTING INCOMING APPLICATION DATA IN AN NFC CHIPSET, FOR IDENTIFICATION OF THE APPLICATION

CROSS-REFERENCE TO RELATED APPLICATIONS

This application is a Section 371 of International Application No. PCT/FR2007/001185, filed Jul. 11, 2007, which was published in the French language on Feb. 14, 2008, under International Publication No. WO 2008/017745 A1 and the disclosure of which is incorporated herein by reference.

BACKGROUND OF THE INVENTION

Embodiments of the present invention relate to a method of routing application data in a Near Field Communication (NFC) system comprising an NFC interface circuit performing contactless data sending and receiving.

Embodiments of the present invention relate in particular to the routing of incoming application data received by the interface circuit.

Embodiments of the present invention globally relate to, the implementation of an NFC chipset as well.

NFC technology is currently developed by an industry consortium named NFC Forum (http://www.nfc-forum.org). The NFC technology derives from the Radio Frequency Identification (RFID) technology and uses NFC components having several operating modes, i.e., a "reader" mode, a "card emulation" mode, and a "device" mode (also called "device-to-device"). In the reader mode, the NFC component operates like a conventional RFID reader to read or write access an RFID chip (e.g., a chip card or contactless tag). The NFC component emits a magnetic field, sends data by modulating the amplitude of the magnetic field, and receives data by charge modulation and inductive coupling. In the "emulation" mode, described in European patent EP 1 327 222 in the name of the applicant, the NFC component operates in passively, like a transponder, to dialog with a reader and be seen by the other reader as an RFID chip. The NFC component does not emit any magnetic field, receives data by demodulating a magnetic field emitted by the other reader, and sends data by modulating the impedance of its antenna circuit (charge modulation). In the "device" mode, the NFC component must match another NFC component in the same operating mode, and each NFC component alternately places itself into a passive state (no field emission) to receive data and in an active state (with field emission) to send data.

In addition to these three operating modes (other operating modes may be designed in the future), an NFC component can implement several contactless communication protocols and is, for example, able to exchange data according to the ISO 14443-A protocol, the ISO 14443-B protocol, the ISO 15693 protocol, or the like. Each protocol defines a transmit frequency of the magnetic field, a method of modulating the amplitude of the magnetic field to send data in active mode, and a method of charge modulation by inductive coupling to send data in passive mode. An NFC component is therefore a multimode and multiprotocol device. The applicant, for example, markets an NFC component under the designation "MicroRead."

Because of its wide communication capabilities, an NFC component is intended to be integrated in portable devices such as mobile phones or Personal Digital Assistant (PDA). An NFC chipset is therefore implemented as shown in FIG. 1, that is a set of chips comprising an NFC component (referenced "NFCR1") and at least one first host processor HP1. "Host processor" designates any integrated circuit having a microprocessor or a microcontroller and which is connected to a port of the NFC component. In various applications, the NFC chipset also includes a second host processor HP2, and occasionally more.

The first host processor HP1 is the main processor of the device in which the NFC component is integrated, whereas the second host processor HP2 is a secure circuit. The host processor HP1 usually is a non-secure processor, for example, the baseband circuit of a mobile phone (or radiotelephony circuit). The host processor HP2 is for example, a Subscriber Identity Module (SIM) card (i.e., the micro controller present in a SIM card). The resources of the NFC component are therefore put at the disposal of the processors HP1, HP2 to allow the processors HP1, HP2 to manage contactless applications. Such applications are shown in FIG. 2, which represents a mobile phone 30 equipped with the NFC system (chipset) of FIG. 1. These applications are: (1) Applications of AP1 type: the NFC component of the mobile phone 30 is in "reader" mode to read or write access a contactless integrated circuit CLCT. In this case, the mobile phone is used like an RFID reader. This type of application can be free and be utilized for example, in reading advertising data inserted in a billboard of a bus shelter. The application can also require a fee and be utilized for example, in reading information reserved for subscribers. The application program AP1 is preferably held and executed by the processor HP1 if the service is free, or is preferably held and executed by the processor HP2 if the service requires the subscriber identification. Thus, as shown in FIG. 1, an application AP1 can be managed by the processor HP1 or the processor HP2. (2) Applications of AP2 type: the NFC component of the phone 30 is in "card emulation" mode to be read by conventional readers RD in pay access applications (e.g., payment machine, metro entrance, or the like). The mobile phone 30 is therefore used like a chip card. The application program AP2 is preferably held and executed by the secure processor HP2, as shown in FIG. 1, because the access to the service requires the subscriber identification. (3) Applications of AP3 type: the NFC component of the phone 30 is in "device" mode and dialogs with another device, for example, a reader integrated in another mobile phone 31 or in a computer 32. This type of application is usually free and allows data packets to be transferred from one device to another (point-to-point file transfer in particular). The application program AP3 is preferably held and executed by the non-secure processor HP1, as shown in FIG. 1, which has a computing power higher than the secure processor HP2 if it is a processor of a SIM card.

Thus, the implementation of an NFC chipset requires the provision of routing (conveying) data flows between each processor HP1, HP2 and the NFC component (data sent via the contactless data transmission channel) and incoming data flows (data received via the contactless data transmission channel) between the NFC component and each processor HP1, HP2. As a result, some practical problems are encountered, which will be understood by referring to FIGS. 3A, 3B.

FIG. 3A schematically shows the architecture of the NFC component. The NFC component includes an interface circuit CLINT for contactless data sending/receiving, equipped with an antenna circuit ACT, wire communication interfaces INTL INT2 linked to the interface circuit CLINT, and a controller NFCC. The interface INT1 is connected to the host processor HP1, and the interface INT2 is connected to the host processor HP2. All of these elements form an NFC chipset.

FIG. 3B shows data flows which must be routed so that the resources of the interface circuit CLINT can be used by each processor HP1, HP2. For the sake of simplicity, the interface circuit CLINT is assumed to be able to send or receive data according to three protocols PT1, PT2, PT3 only, for example ISO 14443-A, ISO 14443-B and ISO 15693, and has the three aforementioned operating modes M1, M2, M3 ("reader" mode, "emulation" mode, and "device" mode). Four different types of data flows are thus distinguished: (1) an outgoing data flow DT1out(Mi, PTi) from a source point P1 located in the processor HP1, transmitted to a destination point Pc located in the interface circuit CLINT, and transmitted by the interface circuit CLINT in a contactless data transmission channel created according to a protocol PTi (PT1, PT2 or PT3) and an operating mode Mi (M1, M2 or M3); (2) an outgoing data flow DT2out(Mi, PTi) from a source point P2 located in the processor HP2, transmitted to a destination point Pc located in the interface circuit CLINT, then transmitted by the interface circuit CLINT via a contactless data transmission channel created according to a protocol PTi and an operating mode Mi; (3) an incoming data flow DT1in(Mi, PTi) received by the interface circuit CLINT via a contactless data transmission channel created according to a protocol PTi and an operating mode Mi, then transmitted by the interface circuit CLINT from a source point Pc to a destination point P1 located in the processor HP1; and (4) an incoming data flow DT2 in(Mi, PTi) received by the interface circuit CLINT via a contactless data transmission channel created according to a protocol PTi and an operating mode Mi, then transmitted by the interface circuit CLINT from a source point Pc to a destination point P2 located in the processor HP2.

As each outgoing data flow can be emitted in three operating modes M1, M2, M3 and according to three protocols PT1, PT2, PT3, nine different configurations are possible for each outgoing data flow (assuming that each mode Mi and protocol PTi combination is authorized). It is therefore insufficient that one processor HP1 or HP2 sends the outgoing data to the interface circuit CLINT. The processor must also specify, for each data string sent, the mode/protocol Mi/PTi configuration to be used by the interface circuit CLINT to transmit the data in a contactless data transmission channel.

When incoming data is received via a contactless data transmission channel by the interface circuit CLINT, the interface circuit CLINT as well as the controller NFCC do not necessarily know which host processor HP1, HP2 receives the data. Consequently, in previous art, the data was sent to both processors HP1, HP2, and the processor not concerned with the data was responsible for not responding.

A more elaborate method of routing incoming data is described in PCT application WO 2004/029860. The method uses, as means of routing incoming data, Application Protocol Data Unit (APDU) commands received via the contactless data transmission channel. However, the method requires new protocols to be developed to implement routing, meaning that the external element sending data in the contactless data transmission channel must specify, in the APDU commands, to which internal element (in particular which host processor) the data must be sent.

In various applications, the external element sending data is not designed to give routing indications regarding which processor receives the data. Routing is an internal feature linked to the fact that several processors of a same NFC chipset share the same interface circuit for contactless data sending/receiving. It is therefore unlikely that a universal routing protocol will be integrated in the near future into devices not complying with an NFC standard. For example, a conventional reader used for payment or access control applications sends commands for secret code authentication and/or checking to contactless chip cards. During an authentication, such a reader does not know if it dialogs with a true contactless card or with an NFC component in "card emulation" mode. Consequently, such a reader is not designed to transmit parameters allowing the application data it sends to be routed inside the NFC chipset.

It is therefore desirable to provide for routing of incoming data received by the interface circuit CLINT, in a simple and efficient way, without requiring the external element sending the data to manage the routing.

It is further desirable to control the data flows between the non-secure processor HP1 of the NFC chipset and the source or destination point Pc (contactless data sent or received via the interface circuit CLINT). These data flows correspond to NFC applications that service providers wish to control with the view of a commercial exploitation, despite the processor HP1 being unsecure. Preferentially, it is also desirable to control data flows between the non-secure processor HP1, other secure processors that can be part of the system, and the interface circuit CLINT.

To perform outgoing data routing while allowing the interface circuit CLINT to be configured in an adapted way, it has been suggested to provide a data transfer protocol "Host Controller Interface" (HCI) of "universal" type, enabling any type of host processor to supply data to be sent to the interface circuit CLINT, while specifying the configuration to be used (protocol PTi and operating mode Mi) to transmit the data in the contactless communication channel. Such a protocol HCI provides data frames, each data frame having header fields and data fields. The data fields include the information necessary for the control of the interface circuit CLINT, in particular fields specifying the start and destination points of the data, the operating mode, and the protocol to be used by the interface circuit CLINT.

However, the conventional protocol HCI provides data frames with long and complex header fields, requiring a considerable processing time before processing the actual data. This problem is called "overheading," which means that extended frame headers overload data flows and affect data transmission time. These header fields of great size moreover require buffers of great size and a high computing power.

Thus, it is desirable to provide a method of routing data in an NFC chipset which is simple to implement and does not require header fields of great length.

BRIEF SUMMARY OF THE INVENTION

A method is provided for routing incoming or outgoing application data in an NFC system having an NFC interface circuit performing contactless data sending and receiving. Routing of incoming application data received by the interface circuit includes conveying at least a first portion of the incoming application data to a destination point located in the NFC system. The destination point is designated as an arbitration point of the routing of incoming application data. The arbitration point analyzes the first portion of the incoming application data so that it identifies the application for which the data is sent to the NFC system. The arbitration point designates a destination point of the application and application processing data, conveys a second portion of the incoming application data to the destination and processing point, and conveys an outgoing application data sent by the destination and processing point to the NFC interface circuit.

According to one embodiment, the analysis of the first portion of the incoming application data by the arbitration point, in order to identify the application, includes the extraction of an application identifier present in the data.

According to one embodiment, the analysis of the first portion of the incoming application data by the arbitration point, in order to identify the application, is completed by the analysis of operating parameters of the NFC interface circuit, such as the operating mode of the interface circuit or the contactless data transmission protocol in which the incoming data is received.

According to one embodiment, routing of the first portion of the incoming application data to the arbitration point, routing of the second portion of the incoming application data to the destination and processing point, and routing of the outgoing application data sent by the destination and processing point to the NFC interface circuit are performed by a routing element separate from the arbitration point.

According to one embodiment, the arbitration point is located in a host processor of the NFC system.

According to one embodiment, the destination and processing point is located in a host processor of the NFC system.

According to one embodiment, the arbitration point is located in a secure host processor of the NFC system.

According to one embodiment, the host processor in which the arbitration point is located is an integrated circuit of a SIM card.

According to one embodiment, the method further includes authenticating the host processor in which the destination and processing point is located, and the second portion of the incoming application data is not conveyed to the destination and processing point if the host processor has not been validly authenticated.

According to one embodiment, authentication of the host processor in which the destination and processing point is located includes checking a certificate presented by the host processor.

According to one embodiment, the arbitration point designates the destination and processing point of the application data by addressing to a routing element a routing command triggering the opening of a bi-directional routing channel between the NFC interface circuit and the destination and processing point.

According to one embodiment, the application data is conveyed within the NFC system through a routing channel defined by a routing channel number and associated routing parameters including at least one identifier of a source point and one identifier of a destination point, and is encapsulated in a frame having a header field including the routing channel number.

According to one embodiment, the interface circuit is configurable according to a predetermined number of operating modes and according to a predetermined number of contactless communication protocols, and the routing parameters associated with the routing channel number include an operating mode parameter and a communication protocol parameter of the interface circuit.

According to one embodiment, a routing channel is managed by a routing table associating the routing parameters with the routing channel number.

An NFC system is also provided having an NFC interface circuit performing contactless data sending and receiving, and an element for routing data within the NFC system. The routing element is configured to process the routing of incoming application data received via the NFC interface circuit by conveying at least a first portion of the incoming application data to a destination point located in the NFC system and designated as an arbitration point of the routing of incoming application data. The arbitration point is configured to analyze the first portion of the incoming application data in order to identify the application for which the data is sent to the NFC system, and designate to the routing element a point of destination of the application data and of processing of the application. The routing element is configured to convey a second portion of the incoming application data to the destination and processing point designated by the arbitration point, and convey outgoing application data sent by the destination and processing point to the NFC interface circuit.

According to one embodiment, to identify the application, the arbitration point is configured to extract an application identifier present in the first portion of the incoming application data.

According to one embodiment, to identify the application, the arbitration point is configured to complete the analysis of the first portion of the incoming application data by analyzing operating parameters of the NFC interface circuit, such as the operating mode of the interface circuit or the contactless data transmission protocol in which the incoming data is received.

According to one embodiment, the routing element is different from the arbitration point and routs the first portion of the incoming application data to the arbitration point, routs the second portion of the incoming application data to the destination and processing point, and routs the outgoing application data sent by the destination and processing point to the NFC interface circuit.

According to one embodiment, the arbitration point is located in a host processor of the system.

According to one embodiment, the destination and processing point is located in a host processor of the system.

According to one embodiment, the arbitration point is located in a secure host processor of the system.

According to one embodiment, the host processor in which the arbitration point is located is an integrated circuit of a SIM card.

According to one embodiment, the system is configured to authenticate the host processor in which the destination and processing point is located, and to withhold the second portion of the incoming application data from the destination and processing point if the host processor has not been validly authenticated.

According to one embodiment, the system is configured to authenticate the host processor by checking a certificate presented by the host processor.

According to one embodiment, the arbitration point is configured to designate the destination and processing point of the application data by addressing to the routing element a routing command triggering the opening of a bi-directional routing channel between the NFC interface circuit and the destination and processing point.

According to one embodiment, the application data is conveyed in a routing channel defined by a routing channel number and associated routing parameters including at least one identifier of a source point and one identifier of a destination point, and is encapsulated in a frame having a header field including the routing channel number.

According to one embodiment, the interface circuit is configurable according to a predetermined number of operating modes and according to a predetermined number of contactless communication protocols, and wherein the routing parameters associated with the routing channel number include an operating mode parameter and a contactless communication protocol parameter of the interface circuit.

According to one embodiment, the system includes a routing table associating the routing parameters with the routing channel number.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3A shows in block form the conventional architecture of an NFC component present in the NFC chipset of FIG. 1;

FIG. 3B shows data flows crossing the NFC chipset of FIG. 1 and corresponding to different applications;

FIGS. 5 to 7 show sequences of data exchanges between processors of the NFC chipset;

DETAILED DESCRIPTION OF THE INVENTION

Figure 4:
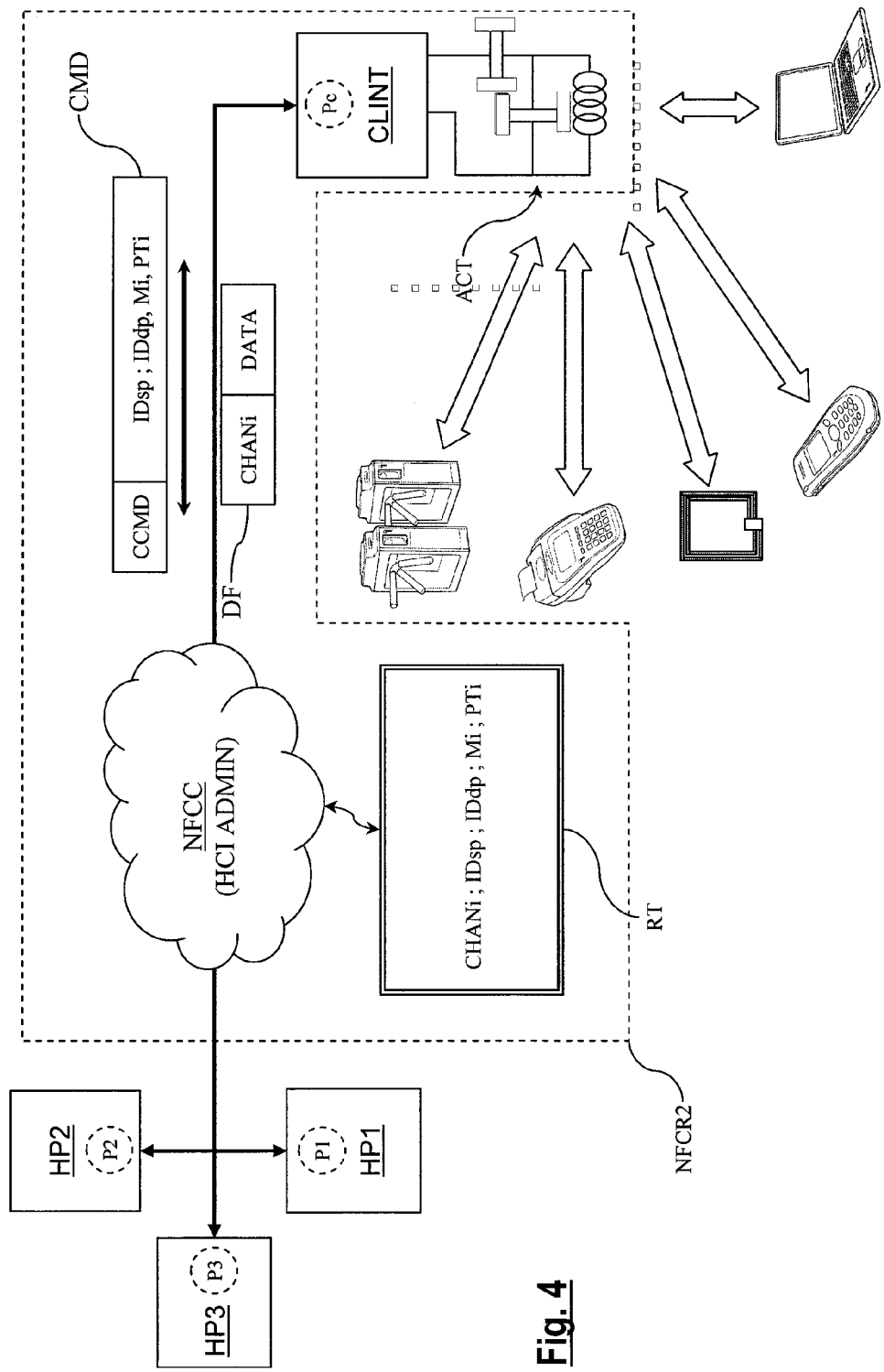
FIG. 4 schematically shows the implementation of the routing process according to embodiments of the invention in an NFC chipset.

FIG. 4 schematically shows the implementation of a method of opening a data path according to preferred embodiments of the invention. The method is implemented in an NFC chipset having an NFC component referenced "NFCR2" and host processors HP1, HP2, HP3. The component NFCR2 includes the same elements as the component NFCR1 described above, in particular a controller NFCC and an interface circuit CLINT for contactless data sending/receiving, equipped with an antenna circuit ACT. For the sake of simplicity, the interface circuit CLINT is assumed to be able to send or receive data only according to three protocols PTi, i.e., the protocol PT1 (ISO 14443-A or "ISOA"), the protocol PT2 (ISO 14443-B or "ISOB"), and the protocol PT3 (ISO 15693 or "ISO15"). In addition, the interface CLINT has the three aforementioned operating modes Mi, i.e., M1 ("reader" mode), M2 ("card emulation" mode), and M3 ("device" mode).

Source or destination points of a data flow in the NFC chipset are designated P1 (point located in the host processor HP1), P2 (point located in the host processor HP2), P3 (point located in the host processor HP3), and Pc (point located in the interface circuit CLINT).

For example, the host processor HP1 is the main processor of the system in which the NFC component is integrated. The host processor HP1 is a non-secure processor, i.e., not including cryptography and authentication circuits of secure processors. The host processor HP2 and the host processor HP3 are secure circuits, such as a SIM card and a credit card chip.

One secure host processor of the NFC chipset, for example the processor HP2, is used to authorize or deny the opening of the data path according to parameters such as the protocol PTi, the operating mode Mi, and the identifiers of the source and destination points of the data path. To that effect, the processor HP2 is previously authenticated by the controller NFCC.

FIG. 5 shows various steps of an authentication sequence of the host processor HP2 by the controller NFCC, at the initialization of the NFC chipset.

During a first step S1, the processor HP2 emits an authentication request to the controller NFCC. At the following step S2, the controller NFCC responds to the request by supplying a random number ("Rnd Nb") and information ("NFC Info") regarding the NFC component (for example, a serial number, a manufacturing date, a number of software version, or the like). At the following step S3, the processor uses an encryption key shared with the host processor HP2 to encrypt the random number RNd Nb received, and preferably the other information NFC Info received, and send an encrypted response ("Encr. Resp") to the controller NFCC.

At the following step S4, the controller NFCC considers the processor HP2 authenticated if it has succeeded in deciphering the information received from the processor HP2 using the encryption key it shares with the authorized secure processors. If such is the case, the controller NFCC sends to the processor HP2 a notification message of authentication including a session key ("SESK"). If the processor HP2 is not authenticated, the controller NFCC refuses any further communication therewith.

If the processor HP2 has been authenticated, the controller NFCC and the processor HP2 can exchange data ("Encr. Data"), in particular configuration or management information, under an encrypted form based on the session key SESK (steps S5 and S6). On the contrary, if the processor HP2 has not been authenticated by the controller NFCC, the controller systematically refuses to open data paths.

The actual creation of a data path or routing channel is performed by the controller NFCC as an administrator Host Computer Interface (HCI) ("HCI ADMIN"). When a command for creating a data path is received (e.g., command "Creation of a route") and is allowable, the controller NFCC allots a routing channel number CHANi to the data path, and then sends a confirmation message to the entity that has sent the command.

More particularly, the controller NFCC is used as administrator of a protocol HCI according to the invention, which has the following features: (i) the use of commands CMD allowing a data path (routing channel) to be managed, in particular commands for opening and closing data paths, and (ii) the use of data frames DF including a header field of short length and a data field (DATA), the header field including a routing channel number CHANi.

Examples of routing commands and examples of data frames are described in Annex 1 which is an integral part of the description. For the sake of simplicity all of the commands that can be provided will not be described. Annex 1 lists essential commands of route creation, route modification, and route suppression, and the responses to such commands (confirmation or error messages). Annex 1 also describes the format of data frames DF, which advantageously has a header field of small size (8 bits).

The commands for opening, closing, or modifying a data path are emitted by one host processor HP1, HP2 or by the interface circuit CLINT and are processed by the controller NFCC. These commands specify the operating mode Mi and the protocol PTi of the interface circuit CLINT for the data path concerned. If the opening of a data path is requested by one host processor HP1 or HP2, the mode Mi and the protocol PTi appearing in the command are used by the controller NFCC to configure the interface circuit CLINT with regard to the contactless communication channel that the interface circuit CLINT must create to send the data that will be received via the data path. If the opening of a data path is requested by the interface circuit CLINT, the operating mode Mi and the protocol PTi specified in the command emitted by the interface circuit CLINT are informative and specify the conditions of operating mode Mi and protocol PTi in which the interface circuit CLINT has received the data to transmit in the data path.

It should be noted that a command for transmitting data by an unopened data path can also trigger a procedure for opening the data path with a previous authorization request.

FIG. 6 shows steps S10, S11, S12, S13, S14 of a general sequence for opening a data path. The sequence can preferably only be executed if the controller NFCC has previously authenticated the host processor HP2.

At step S10, a host processor, for example HP1, requests authorization from the controller NFCC to open a data path ("Route Req."). To that end, the processor HP1 supplies information relating to the data path to be opened. The information notably includes the protocol and the transmission mode of the data path to be opened, as well as identification information relating to the source and destination points of the data path.

At step S11, the controller NFCC requests the authorization to open the data path to the processor HP2 ("Auth. Req."). According to the information received relating to the path to be opened, the processor HP2 authorizes or denies the requested path opening. For example, in some operating modes, the processor HP2 can systematically authorize or refuse the opening of a data path.

At step S12, the processor HP2 authorizes the opening of the data path by addressing to the controller NFCC a determined item of information ("Acc. Granted") including a channel identifier ("CHANi"). At the following steps S13 and S14, the channel identifier CHANi allotted to the data path is supplied by the controller NFCC to the processors HP1 and HP2. If the opening of the data path requested is refused, the processor HP2 notifies the controller NFCC, which sends a message of refusal of channel opening to the processor HP1.

Thus, performing any application corresponding to a determined data path can be controlled by the secure processor HP2 or any other secure processor allotted to this control. For example, applications requiring use of the non-secure host processor HP1 (for example, applications of contactless reading of video files in public places of sale, requiring the computing power of the processor HP1), can be controlled by the access providers. It is the same for applications managed by a processor like the processor HP3 that, although secure, is not allotted to security control within the NFC chipset and is thus submitted to the arbitration of the secure processor HP2.

Figure 7:
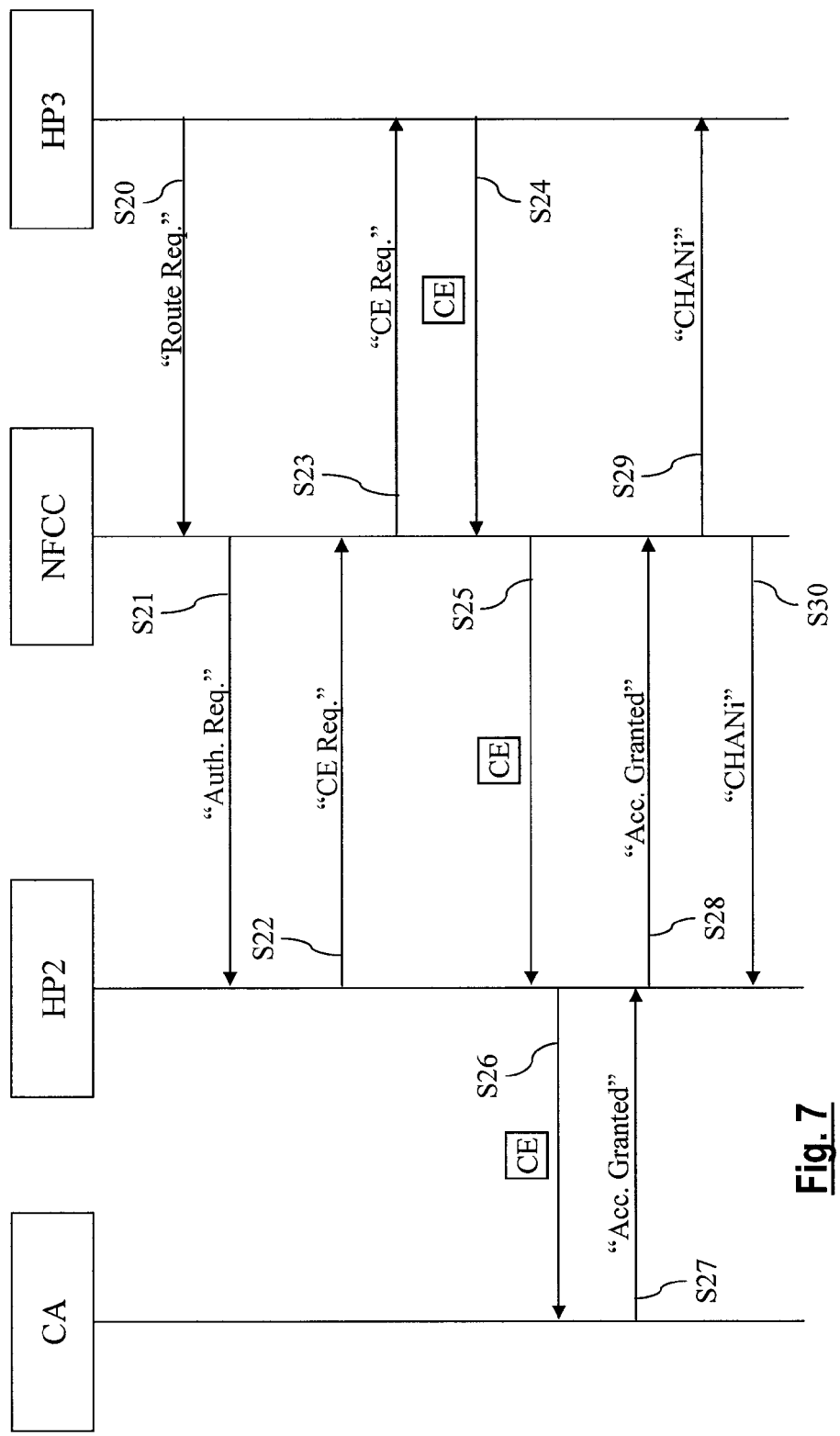

FIG. 7 shows another example sequence of opening a data path according to a preferred embodiment the invention, including steps S20 to S30. The sequence shown in FIG. 7 includes a certificate CE supplied by a certification authority CA. This sequence is adapted in particular to the services requiring paid access.

The processor HP3 emits a request for opening a data path (step S20, "Route Req."). This request is transmitted by the controller NFCC to the processor HP2 (step S21) under the form of an authorization request ("Auth. Req."). The processor HP2 emits a certificate request (step S22, "CE Req.") in response, the certificate request being redirected by the controller NFCC to the processor sender of the request for data path opening, i.e., the processor HP3, during a step S23. At the following step S24, the processor HP3 emits in response the certificate CE requested, which is successively redirected by the controller NFCC (step S25), and by the processor HP2 to the certification authority CA (step S26). The communication link between the certification authority CA and the processor HP2 depends on the nature of the NFC chipset or of the system to which the NFC chipset is connected. If the system is a mobile phone, the link can be established in a mobile network, such as Global System for Mobile communication (GSM).

At the following step S27, the certification authority recognizes or denies the authenticity of the certificate CE received. If the certificate CE received is authentic, the authority sends to the processor HP2 a message ("Acc. Granted") indicating that the access requested is granted and indicates, if need be, an amount to be paid for the access requested. At the following step S28, the processor HP2 informs the controller NFCC that the requested data path opening is authorized. The controller NFCC then supplies a channel number (CHANi) to the processor HP3 (step S29) and to the processor HP2 (step S30).

The sequence illustrated by FIG. 7 can be applied, for example, to the purchase of the access to a service by a user. The processor HP2 authorizes the creation of a data path between the interface circuit CLINT and the processor HP1 when the interface circuit CLINT receives data in device mode ISO B.

It should be noted that all of the information exchanged between the controller NFCC and the processor HP3 can be encrypted using the session key transmitted at step S4 (FIG. 5).

The processor HP2 may not necessarily address a certification authority. In some applications, the processor HP2 can itself check a certificate. Before authorizing the opening of a path, the processor HP2 may authenticate the processor HP3 by checking that the processors HP2 and HP3 share a common secret key (steps S2 to S4 of FIG. 5).

An operator who assigns SIM cards to users can thus control the access to services using the system, independently of the operators who provide the services.

Alternately, the authentication of the host processor HP3 by the host processor HP2 can be previously performed, for example during the initialization of the system. The host processor HP2 then authorizes the opening of a data path only if the host processor that has emitted the opening request has been previously authenticated.

Controlling a data path to implement certain embodiments of the invention can be performed by any technique, for example using multiplexing circuits and/or logic gates controlled by signals supplied by the controller NFCC upon authorization of the secure processor. However a routing method will be described hereinafter, which allows data paths to be simply, rapidly, and efficiently controlled.

According to another preferred embodiment of the invention, the controller NFCC of the NFC component further performs the management of a routing table RT in which data paths are stored, each data path being identified by a routing channel number CHANi.

The data paths stored in the routing table differ at least by the following parameters:

CHANi; IDsp; IDdp, Mi, PTi where CHANi is the routing channel number allotted to the data path, IDsp is an identifier of the source point of the data path, IDdp is an identifier of the destination point of the data path, and Mi and PTi are the operating mode and the contactless communication protocol used by the interface circuit CLINT to send or receive data via a contactless data transmission channel.

Each time the controller NFCC allots a routing channel number CHANi to a data path, it registers the parameters IDsp, IDdp, Mi, PTi indicated in the command in the routing table RT.

An example of a routing table RT created by the controller NFCC is shown by Table 1 in Annex 2. The routing table RT is created after receiving a series of commands for opening paths having source points located in one processor HP1 or HP2 (i.e., a source point P1 or P2). Optionally, the controller can define a secondary destination point intended to receive a copy of data circulating in the data path. The secondary destination point or notification point is determined by the controller from a notification table (not shown), which indicates the data paths for which the data must be notified to the other host processor. Although shown statically in Table 1, the routing table RT is dynamic and may be updated in real time according to the creation, modification, or suppression commands received by the controller NFCC.

In one embodiment, the routing table RT is static and has been prestored by the controller NFCC, for example, upon request of one host processor and at powering up the system. Table 2 in Annex 2 provides an example of a prestored routing table RT the source points of which are the points P1, P2 or P3 located in the host processors HP1, HP2, HP3. The channel number CHANi can also be prestored in the routing table RT for each conceivable routing configuration. In such a prestored table, "Occupied" and "Authorized" fields are provided in each row of the table (one row corresponding to one routing channel). The controller NFCC registers the value "1" in the field "Authorized" of a routing channel which has been authorized by the processor HP2, and registers 0 otherwise. It also registers the value "1" in the field "occupied" when it opens the corresponding data path, and registers the value "0" in response to a command for closing the data path (the examples described in Annex 2 being arbitrary).

Routing the data received in the data frames is under the control of the controller NFCC as well, which refers to the routing table RT to determine the destination points of the data. Advantageously, as it appears in the format of the data frames described in Annex 1, it is not necessary for the source point which sends the data to the processor to specify all of the parameters of the routing channel used. The header field of the data frame simply includes parameterizing bits T and L and 6 bits of channel number (allowing 63 data paths to be simultaneously routed, the channel "0" being reserved to the protocol HCI administration).

Thus, upon reception of a data frame, the controller NFCC sends data back to the destination point designated in the routing table RT, using the channel number CHANi as an index to find the destination point in the routing table RT (as well as possibly the notification point). If the destination point is the point Pc (interface CLINT), the controller NFCC parameterizes the interface circuit CLINT so that it sends the data in a contactless data transmission channel, in accordance with the contactless protocol PTi and operating mode Mi, information appearing in the routing table RT. In one embodiment, the interface circuit CLINT performs its own parameterizing by reading the routing table RT when data is received in a data frame (which requires that a portion of the attributes of the controller NFCC are transferred in the interface circuit CLINT).

Thus, the routing table RT allows the interface circuit CLINT to be parameterized without it being necessary to include the operating mode Mi and contactless communication protocol PTi parameters in the headers of data frames. The routing table RT according to embodiments of the invention is therefore not a simple routing table, in the conventional meaning of the term, but forms a parameterizing table as well.

The data paths created upon request of one host processor HP1, HP2, HP3 or upon request of the interface circuit CLINT are preferably bi-directional. Thus, for example, once a data path has been created by a point P1 located in the processor HP1, to send data in a contactless communication channel defined by the mode parameter M2 and the protocol PT2, all of the data received by the interface circuit CLINT in the mode M2 and according to the protocol PT2 will be sent in this data path and will therefore be received by the point P1. Those skilled in the art will also note that the provision of bi-directional data paths imposes managing possible conflicts, by forbidding two bi-directional paths having different source and/or destination points to use the same mode Mi and protocol PTi parameters for the interface circuit CLINT. For example, the routing table RT shown in Table 1 shows data paths that cannot coexist (for example channel 1 and channel 9, these data paths being described in the same table only by way of illustration).

As described above, routing incoming data according to the PCT application WO 2004/029860 clashes with the fact that new protocols must be developed to implement routing by way of means of Application Protocol Data Unit (APDU) commands, because the external element sending data in the contactless data transmission channel should specify to which internal element (which host processor) the data is sent.

Embodiments of the present invention provide a solution for routing incoming data which offers the advantage of being simple and able to be implemented without modifying the APDU commands commonly used in the industry.

The APDU commands are specific commands linked to an application, or "application commands." Thus, each application type can include a set of APDU commands on its own. These commands, the format of which is provided by the ISO 7816-4 standard, are used by various protocols, in particular ISO 14443-A and ISO 14443-B, which refer to the ISO 7816-4 standard with regard to the application commands.

At the opening of an application session, the external processor that manages the application and that sends incoming application data generally sends a particular APDU command designated SELECT-AID or SELECT-FILE, or a command of the type SELECT-CARD, which includes a field Application Identifier (AID), designating the target application of the command (for example application "VISA," application "MASTERCARD," or the like). Globally, each service provider is allotted application identifiers AID used by the collectivity. In practice the field AID usually designates a directory of the recipient processor which indicates the concerned application and activates the application upon reception of the command. The field AID can be simple (such as a standard APDU command according to ISO 7816-4) or complex, be inserted into data blocks forming the header of the command (command block), particularly the fields called "P1" and "P2" of the APDU commands, or be inserted in a data block attached to the command block.

Generally, the field AID is only sent once during the opening of the application session, which usually is a point-to-point session, i.e., occurring between a point of the external processor that manages the application and a destination point, here a point P1, P2 or P3 in one of the host processors HP1, HP2, HP3.

The routing method is based on an analysis of the first portion of the incoming data, including searching and extracting the identifier AID to identify the application and then determining which processor receives the incoming application data. The analysis of the incoming data is entrusted in priority to the secure processor of the NFC chipset, if such a secure processor exists. In the example of the NFC chipset described above, this secure processor is the processor HP2, which will generally be, in practice, a processor of a SIM card.

Thus, the first portion of the incoming data is exclusively sent to a point P2(AR) located in the secure host processor HP2, designated as an arbitration point of incoming data routing. The arbitration point P2(AR) processes the incoming data until determining the application identifier AID or identifying the application using a derived method described hereinafter. When the arbitration point P2(AR) has identified the application, the arbitration point determines a destination point Pi that must process the application session. This determination is performed according to an internal parameterizing which is under the control of operators and that can be translated by a correspondence table stored by the processor HP2. The arbitration point P2(AR) then sends to the NFC controller a request for opening a communication channel towards the point Pi and all of the second portion of the incoming data is sent to the point Pi designated.

Thus, here as well, an operator who allots SIM cards to users can control the access to services that come under the form of incoming data, independently of the operators who provide the services, or after reaching an agreement therewith.

Figure 8:
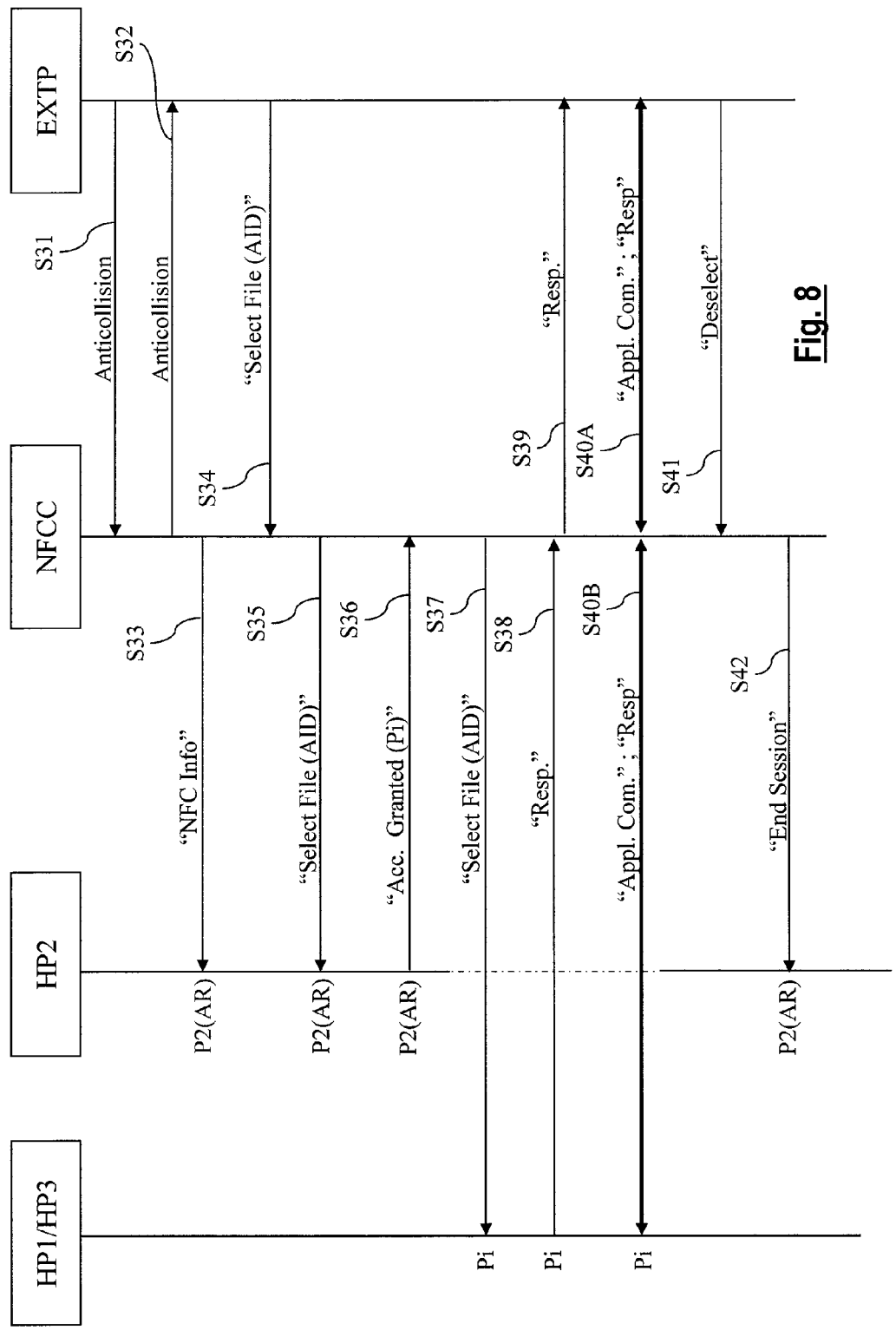
FIG. 8 shows an example sequence of incoming data routing performed in accordance with preferred embodiments of the invention.

FIG. 8 shows a first example of incoming data routing according to embodiments of the invention, assuming that the data contains an identifier AID. The routing sequence illustrated includes an external processor designated "EXTP," the controller NFCC, the secure processor HP2 as a processor designated as arbitrator of internal data routing, and more particularly the arbitration point P2(AR) within the processor HP2, which can correspond to a particular program executed by the processor HP2, and the host processors HP1 and HP2 as possible recipients of incoming data, and more particularly a point Pi located in one of the processors HP1, HP2.

During steps S31 and S32, the controller NFCC alone performs the management of a conventional anti-collision sequence that includes receiving the anti-collision commands (S31) and sending back the corresponding responses (S32) until the first application command is received. During the process of the anti-collision sequence, or immediately after this sequence, the controller NFCC sends information on the contactless communication protocol (ISOA, ISOB, or the like) involved to the arbitration point P2(AR) (step S33). The arbitration point P2(AR) is thus informed that it will shortly receive a command of application session opening (first portion of the application data) and can already pre-select in registers a list of applications authorized for the contactless communication protocol concerned, and a corresponding list of destination points Pi authorized to process these applications.

At the following step S34, the controller NFCC receives the first application command, which includes the application identifier AID. As indicated above this command is, for example, the conventional command currently used "SELECT-FILE" or "SELECT-AID". It can also be a command of the type "SELECT-CARD" or any other APDU command containing the identifier AID.

During a step S35, the controller NFCC sends this command to the arbitration point P2(AR), which determines the manager of the application identified. In this example sequence, it is assumed that the application must be processed by a point Pi located in one host processor HP1 or HP3.

In that case, during a step S36, the processor HP2 sends to the controller NFCC a command "Acc. Granted(Pi(HPj))" (access granted) including the designation of the destination point Pi, for example P1 or P3, located in a host processor HPj, here HP1 or HP3, which is designated to process the application. The command "Acc. Granted(Pi(HPj))" can be the route opening command described in Annex 1, a specific route opening command that the arbitration point P2(AR) only is authorized to send, or a group of commands including the route opening command described in Annex 1.

As soon as the route is created, for example by registration in a static or dynamic routing table as described above, the controller NFCC immediately sends the command "Select File" back to the destination point Pi, during a step S37. In effect this command has not been received by the destination point. It must therefore be sent to the point Pi to initiate the application session. During a step S38, the controller NFCC receives a response "Resp." from the point Pi, and sends this response to the external processor during a step S39.

During various steps represented by two steps S40A and S40B for simplicity reasons, the point Pi and the external processor EXTP exchange application data including, for example, commands ("Appl. Com.") and responses ("Resp.") which are specific to the application. During the application session, the controller NFCC acts as a routing intermediary but remains transparent for the two elements Pi, EXTP performing the session.

The session ends during a step S41, when the controller NFCC receives a command to end communication from the external processor, for example, the conventional command "DESELECT." During a step S42, the controller NFCC closes the routing channel to the point Pi and notifies the arbitration point P2(AR) of the session end and the channel closing, for example, by using a message "End Session."

Figure 9:
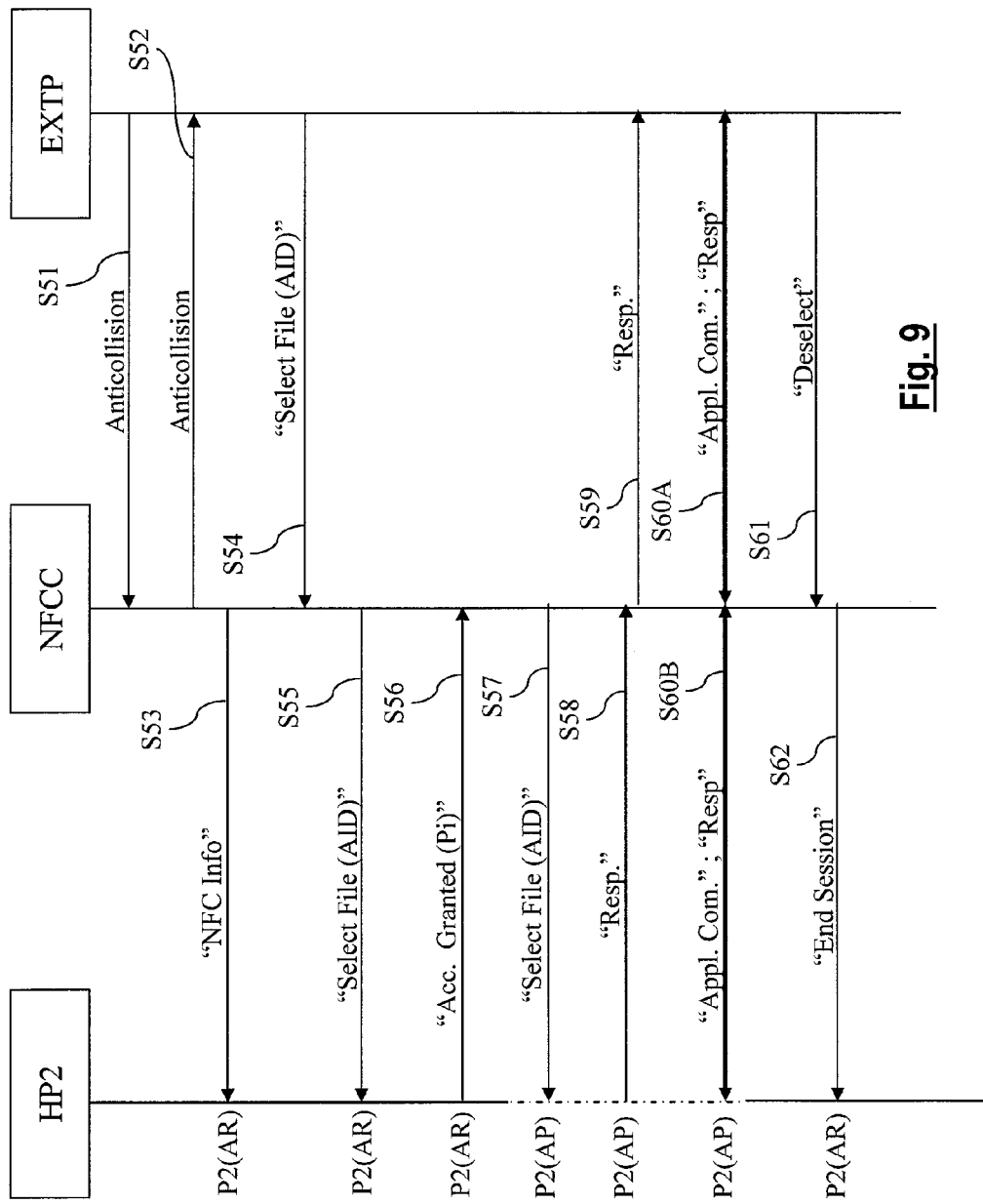
FIG. 9 shows another example sequence of incoming data routing performed in accordance with preferred embodiments of the invention.

FIG. 9 shows a second example of an incoming data routing sequence according to embodiments the invention. This routing sequence includes steps S51, S52, S53, S54, S55, S56, S57, S58, S59, S60A, S60B, S61, S62 similar to steps S31, S32, S33, S34, S35, S36, S37, S38, S39, S40A, S40B, S41, S42 of the first example of routing sequence, and only differs by the fact that at the step of selecting the destination point (step S56, "Acc. Granted"), the arbitration point P2(AR) designates a point P1 which is located in the processor HP2, designated P2(AP), dedicated to the application processing. In other words, the processor HP2 decides it must process the application concerned on its own. The controller NFCC however sends the command Select File (AID) to the point P2(AP), assuming that the arbitration point P2(AR) does not communicate this piece of information to the processing point P2(AP), although being located in the same processor (application software layers and management software layers being here assumed to be independent and isolated, rather than being included when they are executed by the same processor).

In another example of an incoming data routing sequence not shown, the arbitration point P2(AR) decides that the request for application session opening must be rejected, either because it does not recoginze the application concerned (no processing program being provided), or because it has been configured by the operator not to process this application (such as a paid application not subscribed to by the holder of the SIM card/processor HP2). In the first case, the arbitration point P2(AR) does not send a response and the controller NFCC does not send a response either to the external processor, which ends the communication with the NFC chipset at the end of a waiting period provided by the application (i.e., by the program of the application executed by the external processor). In the second case, and if the application provides a refusal response, the arbitration point P2(AR) sends the refusal response to the controller NFCC, which sends the refusal response to the external processor.

It is implicitly assumed in the description above that the controller NFCC is not configured to route all of the second portion of the incoming application data to the arbitration point P2(AR) by default, and that it is configured to route to the arbitration point only the first command received after the anti-collision sequence, this first command being assumed to contain the application identifier AID expected. Thus, if the arbitration point P2(AR) does not send the command "Acc. Granted" to the controller NFCC after the latter has transmitted the first application command thereto, the controller NFCC does not send any application command to the arbitration point P2(AR) which implies that the communication started with the external processor will be ended.

In one embodiment, the processor is configured to route to the arbitration point P2(AR) all of the data received, until the latter transmits the command "Acc. Granted" allowing a new route to be created for incoming data. This embodiment allows management of possible applications in which generic commands are sent by the external processor before the command identifying the application is received. In that case, and as a precaution, all of the commands or data received are stored in a buffer circuit by the NFC controller, and are then sent to the destination point Pi designated by the arbitration point.

The routing method described above is based on identifying the application by analyzing the first portion of the incoming data and can also be implemented when the application concerned does not use any identification command including the field AID, or when the application concerned is supported by a protocol not providing any command including a field of identification of the application ("applications without AID"). For example, the ISO 15693 protocol does not provide any AID and the applications using this protocol therefore cannot clearly identify the applications. A derived method is therefore used to identify the application because the experience shows that any application without AID can nevertheless be identified by a set of parameters, especially with the first command sent, which is usually customized in the applications without AID. The protocol used and the operating mode of the contactless interface circuit CLINT can also be used as complementary parameters for application identification.

Thus, as the arbitration point P2(AR) receives at least the first command and is informed of the communication parameters by the controller NFCC ("NFC Info," step S33), the arbitration point can identify the corresponding application by starting analysis of the first data received and, if necessary, by completing this analysis using communication parameters (operating mode Mi of the interface circuit CLINT and protocol PTi of the incoming data). A correspondence table between these various parameters and the corresponding applications, as well as the corresponding processing points Pi, can be supplied to that effect to the arbitration point by the operators in charge of implementing the applications. Thus, the analysis of the incoming data for the application identification is not limited to extracting the AID.

Preferably, when security protection is available in the NFC chipset, the method is executed by the arbitration point only if the destination point Pi of the application data has been authorized to manage the application by presenting a valid certificate. Otherwise, the arbitration point does not transmit the command "Acc. Granted" allowing a route toward this destination point to be created. In addition, a session key (SESK) defined during the step of authenticating the processor HP2 can be used to secure the exchanges of administration data between the controller NFCC and the arbitration point P2(AR) before opening the communication channel towards the point Pi.

Table 3 in Annex 2 shows a simplified example of an incoming data routing table having prestored data paths activated only upon request of the arbitration point P2(AR) of the processor HP2 using the internal command "Acc. Granted" sent to the controller NFCC. To that end, a column "Occupied" is provided for each data path. This column includes by default a flag having an inactive value, for example 0, meaning that the corresponding data path is not validated. After activating the processor HP2 using the internal command "Acc. Granted," the flag is changed to 1. The data paths toward a point P1 of the processor HP2 are not shown in the table for simplicity reasons. The table will be, in practice, of a greater size if all of the possible destination points Pi are shown. In addition, the source point Id(Pc) of the routing mentioned in the table is a virtual source point considered as located in the interface circuit CLINT, although corresponding to a remote point located in an external processor. Viewed from the angle of the proposed routing technique, the application data sent by the external processor is seen as if sent by the interface circuit CLINT, which is actually transparent to the application. On the other hand, viewed from the angle of the application, only one communication channel exists, established between the processing point Pi and the external processor, although this communication channel is actually formed on the one hand by the internal routing channel created between the interface circuit CLINT and the processing point Pi, and on the other hand by the contactless data sending/receiving channel created between the interface circuit CLINT and the external processor.

This static routing table can be replaced by a dynamic routing table, which is initially empty. The dynamic routing table dedicated to the incoming data is dynamically filled in or emptied by the controller NFCC at the speed of the authorizations granted and the routings requested by the arbitration point, and at the speed of the closings of routing channels in response to the command DESELECT.

Those skilled in the art will however note that the method of routing incoming data which has just been described is independent of the use of a routing table. Routing the incoming data can be implemented by using a conventional protocol HCI, i.e., without using a routing table and data frames having a header field of small length. Routing can also be implemented by any other conventional technique, without using a protocol HCI, for example, by forming hardware data paths using multiplexing circuits or logic gates controlled by signals supplied by the NFC controller after authorization of the arbitration point.

Also, the authentication of the processor including the arbitration point of the incoming data routing is a feature of preferred embodiments of the invention which is, although important in practice for security reasons, nevertheless optional. Routing incoming data must be secured if the application sessions correspond to paid services. However, incoming data routing according to embodiments of the invention resolves a technical problem of rationalization of data flow processing as well, and to a problem of electrical energy savings. For example, if several host processors process all of the incoming data at the same time, the result would be a greater electrical energy consumption. Methods of collective decision should also be provided so that the processors agree on the question to know which processor must process the incoming data. The method according to embodiments of the invention is therefore not only intended to be implemented in a secure NFC chipset, but resolves a global technical problem going beyond security concerns.

Figure 10:
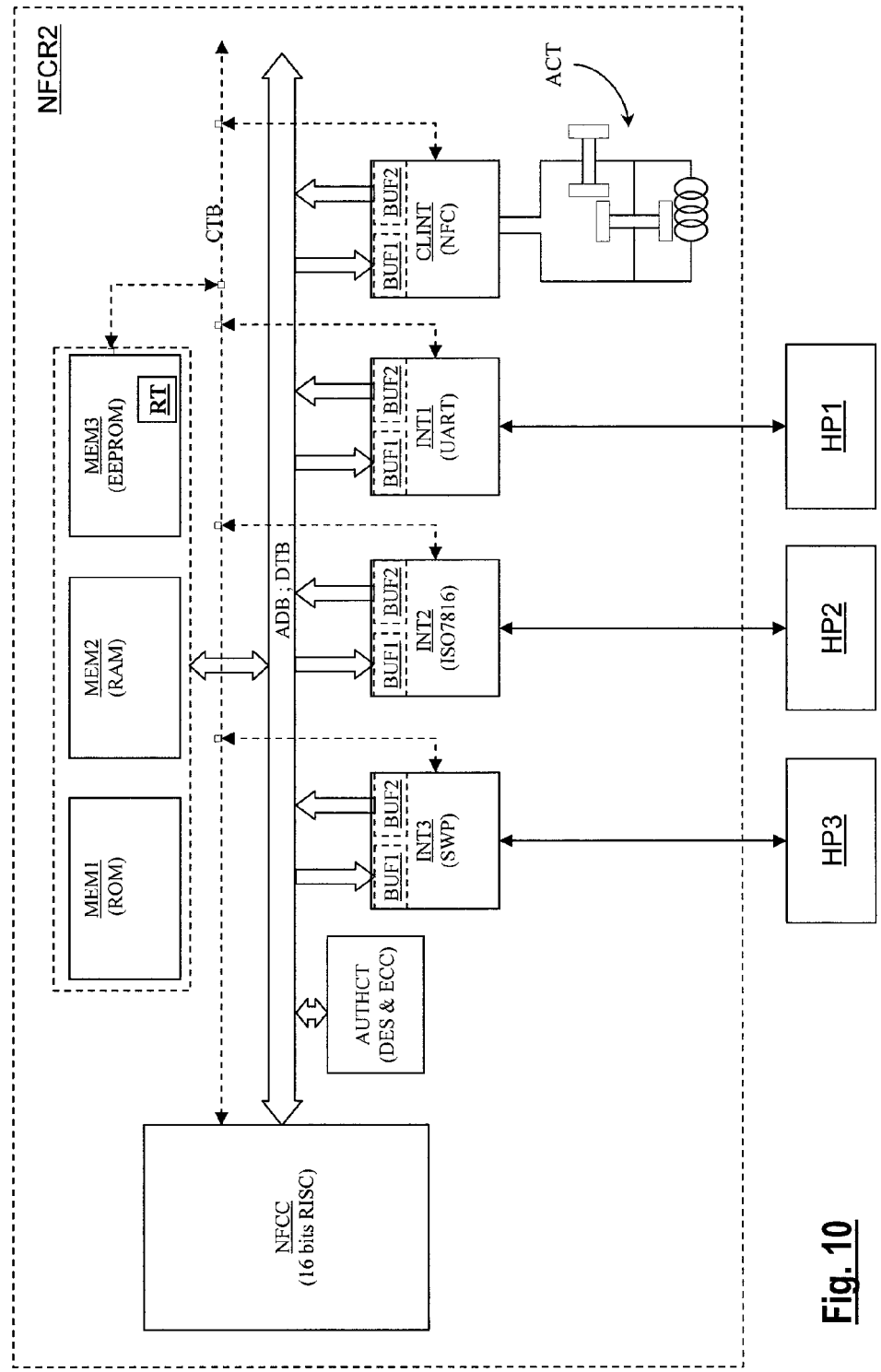
FIG. 10 shows an example of hardware architecture of a NFC component present in the NFC chipset of FIG. 4.

FIG. 10 shows an example of hardware architecture of the component NFCR2 of FIG. 4. The component includes the controller NFCC and the interface circuit CLINT already described; a memory array comprising a program memory MEM1 of Read Only Memory (ROM) type, a data memory MEM2 of Random Access Memory (RAM) type, and an electrically erasable and programmable memory MEM3 of EEPROM type in which the routing table RT is stored; an authentication and error correction circuit AUTHCT having Data Encryption Standard (DES) and Elliptic Curve Cryptography (ECC) algorithms, or other cryptography algorithms; a connection port INT1 of Universal Asynchronous Receiving Transmitting (UART) type, to which the host processor HP1 is here connected; a connection port INT2 of ISO 7816 type to which the host processor HP2 is here connected (the processor HP2 here being assumed to be a SIM card); a connection port INT3 of Single Wire Protocol (SWP) type allowing the host processor HP3 to be connected; a data bus DTB and an address bus ADB linking the memory array, the controller NFCC, the interface circuit CLINT and the ports INT1, INT2, INT3; and a control bus CTB allowing these various elements to be controlled and read and/or write accessed by the controller NFCC.

The interface circuit CLINT and the ports INT1 INT2, INT3 each include an input buffer BUF1 at a parallel input and an output buffer BUF2 at a parallel output that is respectively read and write accessible via the data bus DTB and the address bus ADB. The exchange of data forming the routing commands or the data frames between the host processors HP1, HP2, HP3 and the controller NFCC or the interface circuit CLINT is thus performed by data blocks the size of buffers BUF1, BUF2, and is clocked by the controller NFCC.

The routing table is only accessible by the controller NFCC. Consequently, the routing table can be modified only if the host processor HP2 is authenticated by the controller NFCC.

Figure 11:
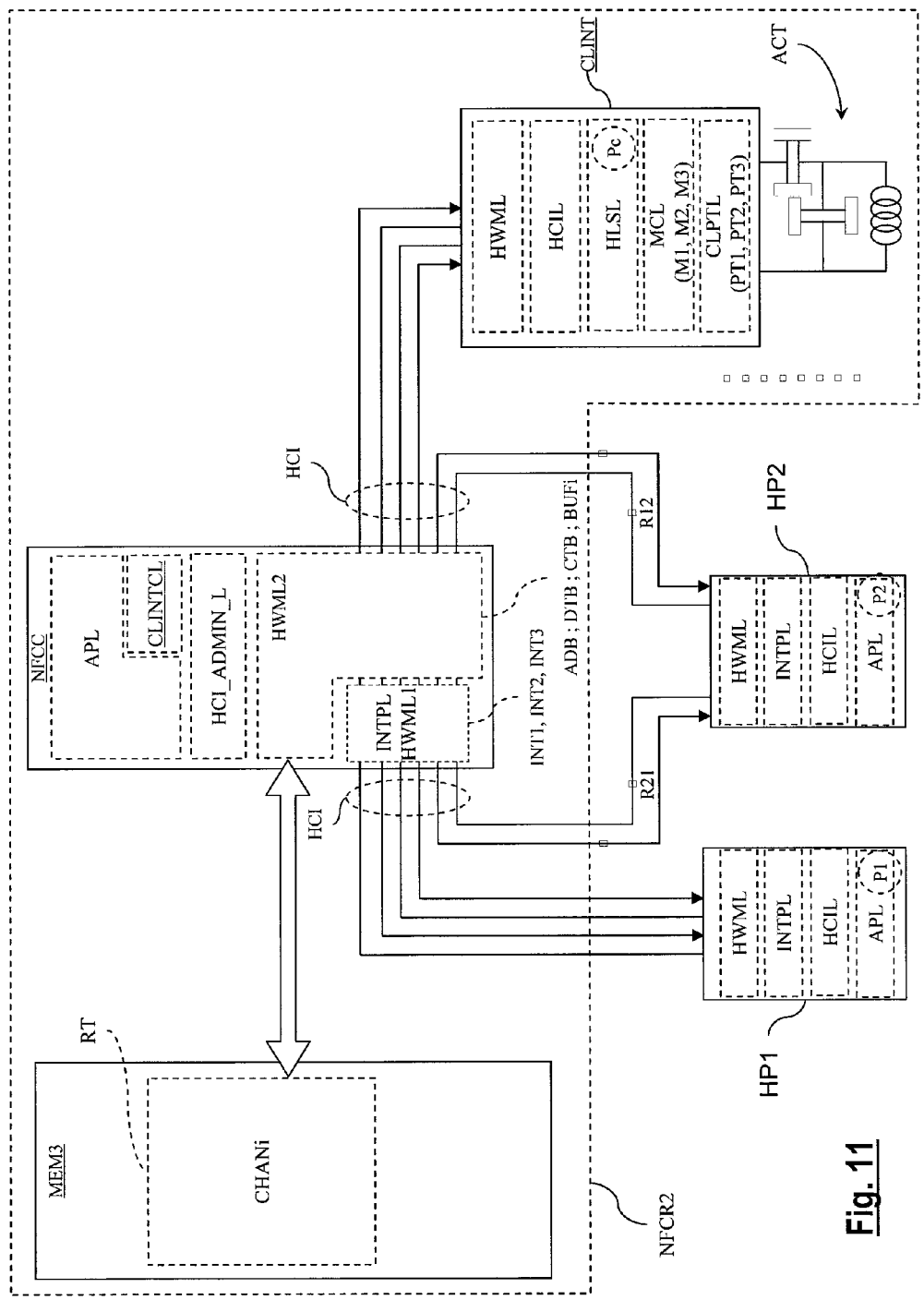
FIG. 11 shows an example of software architecture of the NFC component of FIG. 10.

FIG. 11 shows an example of software architecture of the component NFCR2 and host processors HP1, HP2. For simplicity, the software modules corresponding to incoming data routing have not been represented. The software architecture includes, for the NFC component and the host processors of the system, several software layers going from the lowest level (data link layer) to the highest level (application layer). The representation of these software layers in FIG. 11 is simplified in relation to the real software architecture of a NFC chipset but is sufficient for those skilled in the art wishing to implement embodiments of the invention in the way described herein.

Figure 1:
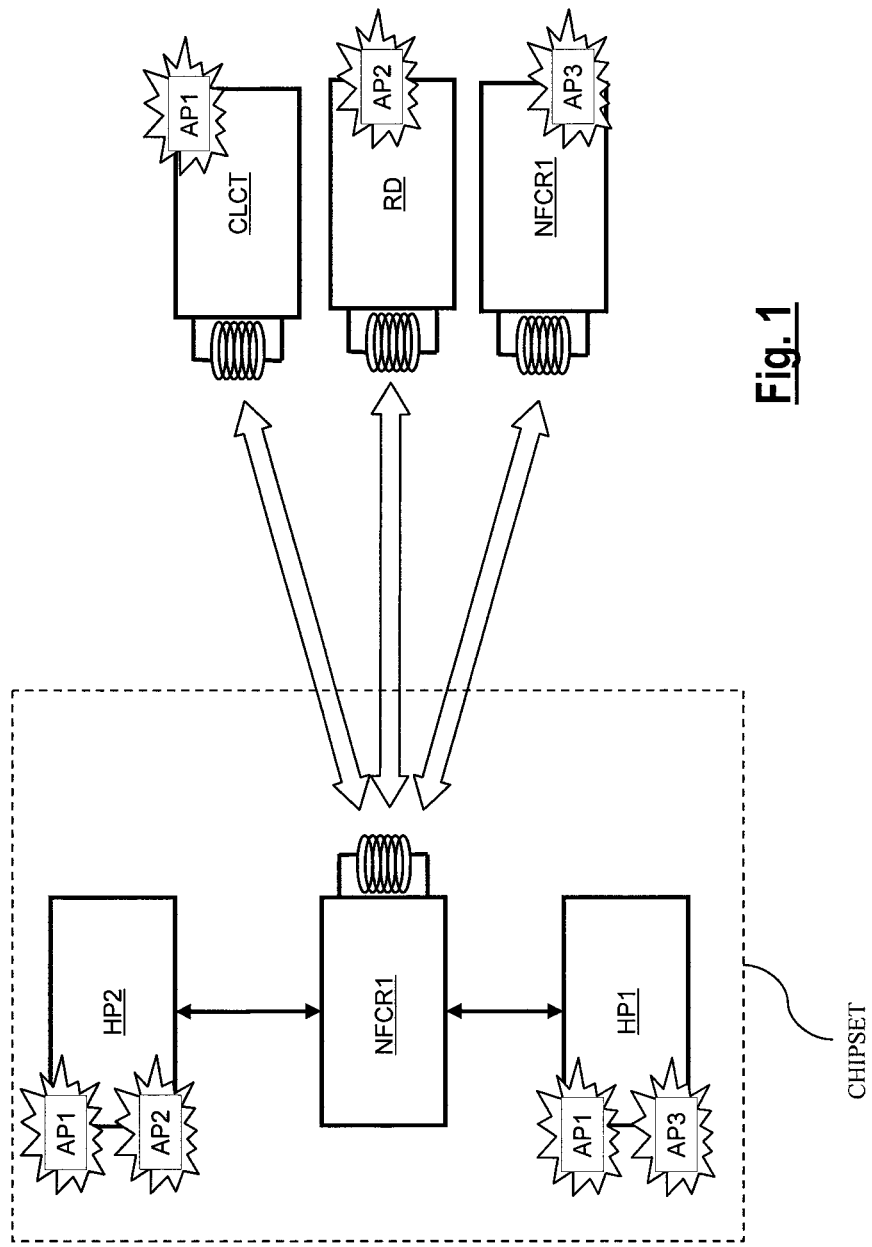
FIG. 1 shows in block form conventional architecture of an NFC chipset, and contactless circuits with which the NFC chipset can dialog.
Figure 2:
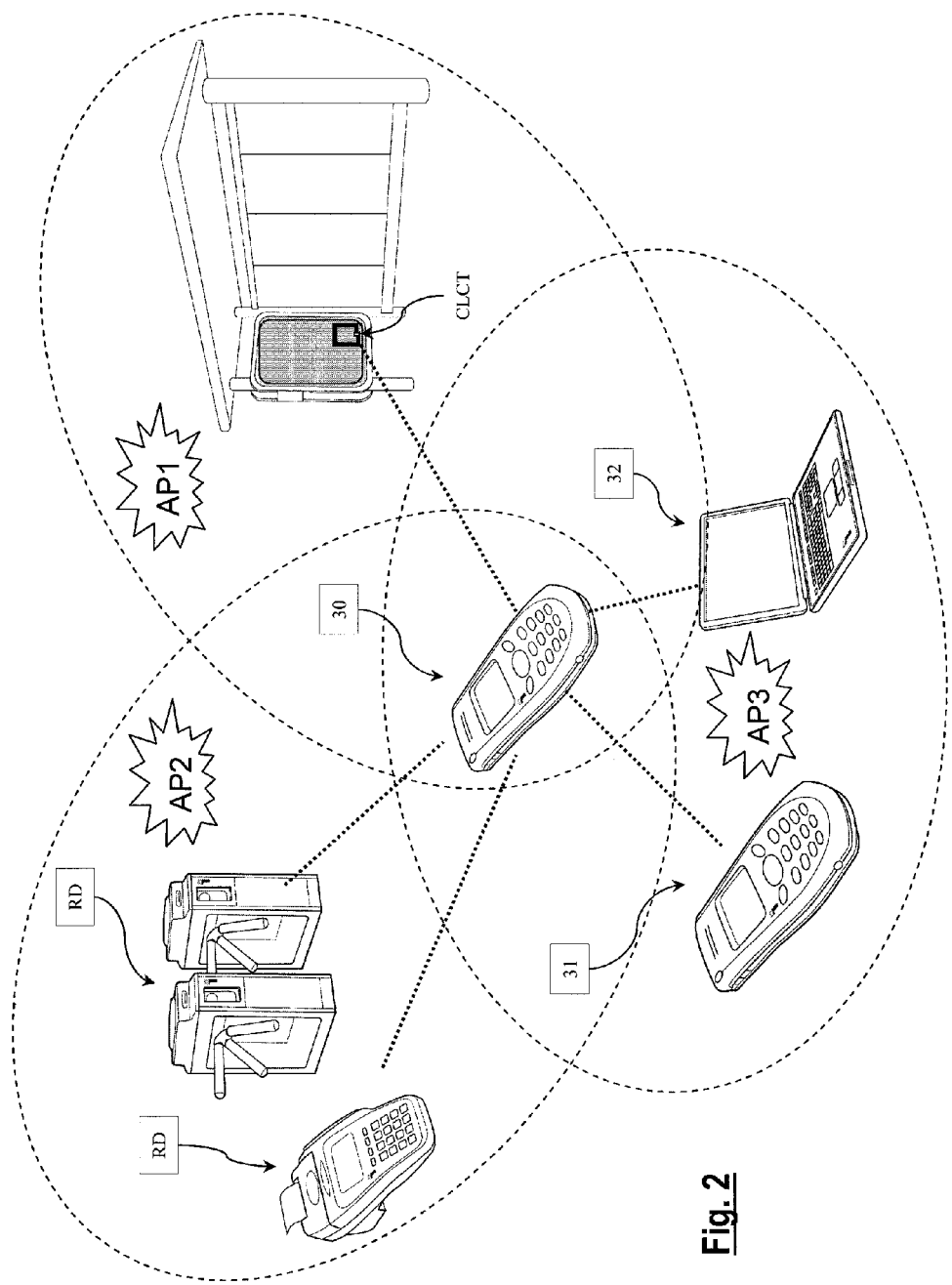
FIG. 2 shows various applications of an NFC chipset integrated in a mobile phone.

Each host processor HP1, HP2 includes at least four software layers, in an ascending order of levels: (1) A lowest level Hardware Management Layer (HWML) manages the operation of hardware elements allowing the host processors to exchange data with the controller NFCC. This layer is, for example, the interface management layer UART for the processor HP1 and the interface management layer ISO7816 for the processor HP2. (2) An Interface Protocol Layer (INTPL) manages the protocol of the communication ports INT1, INT2, INT3. This layer is, for example, the protocol management layer UART for the processor HP1 and the protocol management layer ISO7816 for the processor HP2. (3) An HCI Layer (HCIL) manages the protocol HCI, i.e., which manages the creation of a communication channel by generating the commands described above and in Annex 1 and by processing the response messages to such commands. This layer is based on the INTPL and HWML layers, which are nearly transparent thereto. (4) An Application Layer (APL) of high level manages the RFID applications, such as those shown in FIGS. 2 and 4 (reading of a chip card or an electronic tag, emulation of a chip card, dialog in device-to-device mode with an external processor to exchange files, or the like). This layer can includes of several application programs, each being secure or unsecure (according to the internal resources of the processor) and each using this type of protocol PTi and that operating mode Mi of the interface circuit CLINT. Thus, this high level layer is based on the layers HWML, INTPL and the layer HCIL, which are nearly transparent thereto. The speed of data transfer through the data paths created thanks to the HCIL layer according to the invention advantageously leads to a substantial increase of the performances of the APL layer.

The source or destination points P1 and P2 located in the host processors can be "services" (determined applications). These services can request the controller NFCC, each service independently of the other, to create data paths to simultaneously use the interface circuit CLINT (subject to collisions of modes and protocols, as indicated above). Thus, this software architecture allows a service to be implemented as source or destination points of a data path, and allows several data paths to be simultaneously created between two entities, for example between two host processors or between a host processor and the interface circuit CLINT.

In a corresponding way, the controller NFCC includes the following software layers: (1) HWML1 and INTPL layers of the same type as the HWML and INTPL layers present in the host processors. To simplify the diagram, the layers appear in the controller NFCC but are actually located in the ports INT1 and INT2, which are considered as being part of the controller NFCC, as well as the buses ADB, DTB, CTB. The processing of the UART and 7816 protocols is here performed in the ports INT1, INT2, which put their input and output buffers BUF1, BUF2 at the disposal of the controller NFCC via the buses ADB, DTB, CTB. (2) Another low level HWML2 layer allows the controller to write the buffers BUF1 and read the buffers BUF2, via the buses ADB, DTB, CTB, by splitting up the data frames or the commands into data blocks the same size as the buffers. (3) An HCI-ADMIN-L layer or protocol administration layer HCI dialogs with the HCIL layers of the host processors HP1, HP2 as routing administrator. Thus, this layer executes the tasks of data path allocation described above, and read and write access to the routing table RT via the low level HWML2 layer. (4) A Contactless Interface Control Layer (CLINTCL) manages the interface circuit CLINT and indicates the mode Mi and the protocol PTi to use to send data in a contactless communication channel. To that end, the CLINTCL layer exploits the parameters PTi and Mi present in the routing table. More particularly, the HCI-ADMIN-L layer writes the parameters in the routing table in response to data path opening commands, whereas the CLINTCL layer searches the table for these parameters using as an index the channel number of the data frames sent by the host processors HP1, HP2. This layer also controls the interface circuit CLINT in contactless data reception mode and cyclically requests the interface circuit CLINT to scan the modes ("reader" mode, "emulation" mode, and "device" mode) and, in each mode, to search for incoming data. The interface circuit CLINT emits a magnetic field at regular intervals to interrogate possible contactless cards or tags (or other portable objects with contactless operation) which could be present in its interrogation field. The interface CLINT also puts itself in a listening mode ("emulation" mode) at regular intervals to detect if a reader in active mode sends interrogation messages. An optional APL layer can manage applications by itself, like the host processors. Although it has not been previously described some applications can also be undertaken by the NFC component itself. In that case, the communication of data between the controller NFCC and the interface circuit CLINT can be made by passing through the communication channel HCI if the interface circuit CLINT is equipped with the INTPL layer, which is the case in the embodiment shown in FIG. 11.

Eventually, the interface circuit CLINT includes the following software layers: (1) On the controller NFCC side, a low level HWML layer equivalent to the HWML2 layer of the controller NFCC manages the data buffers BUF1, BUF2 via the buses ADB, DTB, CTB. (2) An HCIL layer (as indicated above) renders the interface circuit CLINT compatible with the protocol HCI and offers more possibilities of implementation of embodiments of the invention (in particular the fact that the interface circuit CLINT generates the data frames to route data received via a contactless communication channel) to the host processors. (3) On the antenna circuit ACT side, a Contactless Protocol Layer (CLPTL) and a Mode Control Layer (MCL) perform the control and processing of the electrical signals applied to or received by the antenna circuit ACT for the implementation of operating modes M1, M2, M3 and protocols PT1, PT2, PT3. (4) Between the layers located on the controller side and the layers located on the antenna circuit side, a central High Level Service Layer (HLSL) allows several source or destination points Pc to be defined in the interface circuit CLINT, to create several data paths with multiple points P1, P2 in the APL layers of the host processors HP1, HP2. Obviously, this architecture of high level is optional and multiple points Pc virtually located in the interface circuit CLINT can be managed by the controller NFCC.

It will clearly appear to those skilled in the art that embodiments of the present invention are susceptible of various embodiments. Thus, the invention is not limited to a system having several host processors and an NFC component. It also covers the control of the execution of applications in a system having one host processor only and executing several applications brought to communicate between them.

In addition it will be possible, in the near future, to integrate the host processors on the same support as the NFC component itself. The notion of a "chipset" is therefore not limited to a set of chips manufactured on different semiconductor dies and globally includes the case where all the elements or processors forming the chipset share the same substrate to form one chip. These elements or processors can be totally virtual and can correspond to different programs, or software layers, executed by the same processor or by a group of networked processors. Embodiments of the invention therefore globally apply to an NFC "system." The term "system" includes a chipset formed by a set of separated chips, a system having a set of integrated circuits implanted on the same substrate, and a system wherein elements, particularly the host processors and the NFC controller, are virtual elements although functionally different from each other and interacting therebetween.

The command formats are described herein by way of example only. In particular, the bit "T" can be suppressed to obtain 128 routing channels instead of 64 while keeping an 8-bit header field. The format of the routing table is likewise supplied by way of example, the table can be managed dynamically or statically, or both.

Annex 1 (Integral Part of the Description)
A/ Examples of Routing Commands
General Format

|  | Header |  | Parameters |  |
|---|---|---|---|---|
| Size | 1 bit | 1 bit | 6 bits | 2 or 3 bytes |
| Means or contains | T | L | CCMD | According to command |
| Value | 1 | 0-1 | 0-31 |  |

T = Type; T = 1 for a command or a response to a command
L = length of the field "parameters": 2 bytes if L = 0 or 3 bytes if L = 1;
CCMD = code of the command or the message Examples of Commands and of Response Messages:

Command "Route Creation":

|  | Header |  | Parameters |  |  |  |  |
|---|---|---|---|---|---|---|---|
| Size | 1 bit | 1 bit | 6 bits | 1 byte | 1 byte | 4 bits | 4 bits |
| Means or contains | T | L | CCMD | IDsp | IDdp | Mi | PTi |
| Value | 1 | 1 | VAL1 | 0-255 | 0-255 | 0-15 | 0-15 |

VAL1 = value of the code of the command
IDsp = Identifier of the source point of the command
IDdp = Identifier of the destination point of the route
Mi = operating mode of the interface circuit (M1, M2 or M3)
PTi = contactless communication protocol (PT1, PT2 or PT3)

Message "Route Creation OK"

|  | Header |  | Parameters |  |  |  |
|---|---|---|---|---|---|---|
| Size | 1 bit | 1 bit | 6 bits | 1 byte | 6 bits | 2 bits |
| Means or contains | T | L | CCMD | IDsp | CHANi | RFU |
| Value | 1 | 0 | VAL2 | 0-255 | 0-63 | 0-3 |

VAL2 = value of the code of the response
IDsp = Identifier of the source point of the command
CHANi = Number of the allotted route (Channel Number)
RFU = Reserved for future use Message "Route Creation Error"

|  | Header |  | Parameters |  |  |
|---|---|---|---|---|---|
| Size | 1 bit | 1 bit | 6 bits | 1 byte | 1 byte |
| Means or contains | T | L | CCMD | IDsp | IDdp |
| Value | 1 | 0 | VAL3 | 0-255 | 0-255 |

VAL3 = value of the code message
IDsp = Identifier of the source point of the command
IDdp = Identifier of the destination point of the route
Mi = operating mode of the interface circuit (M1, M2 or M3)
PTi = contactless communication protocol (PT1, PT2 or PT3)

Command "Route Modification" or "Route Suppression"

|  | Header |  | Parameters |  |  |  |  |  |
|---|---|---|---|---|---|---|---|---|
| Size | 1 bit | 1 bit | 6 bits | 1 byte | 6 bits | 2 bits | 4 bits | 4 bits |
| Means or contains | T | L | CCMD | IDsp | CHANi | RFU | Mi | PTi |

-continued

| | Header | | | Parameters | | | |
|---|---|---|---|---|---|---|---|
| Value | 1 | 1 | VAL4 or VAL5 | 0-255 | 0-63 | 0-3 | 0-15 | 0-15 |

VAL4 or VAL5 = value of the code of each command
IDsp = Identifier of the source point of the command
CHANi = Number of the route to modify or suppress
RFU = Reserved for future use
Mi = operating mode of the interface circuit (M1, M2 or M3)
PTi = contactless communication protocol (PT1, PT2 or PT3)

Messages "Route Modification OK" or "Route Suppression OK"

| | Header | | | Parameters | | | |
|---|---|---|---|---|---|---|---|
| Size | 1 bit | 1 bit | 6 bits | 1 byte | 6 bits | 2 bits |
| Means or contains | T | L | CCMD | IDsp | CHANi | RFU |
| Value | 1 | 0 | VAL6 or VAL7 | 0-255 | 0-63 | 0-3 |

VAL6 or VAL7 = value of the code of each message
IDsp = Identifier of the source point of the command
CHANi = Number of the route modified or suppressed
RFU = Reserved for future use Messages "Route Modification Error" or "Route Suppression Error"

| | Header | | | Parameters | | | |
|---|---|---|---|---|---|---|---|
| Size | 1 bit | 1 bit | 6 bits | 1 byte | 6 bits | 2 bits |
| Means or contains | T | L | CCMD | IDsp | CHANi | RFU |
| Value | 1 | 0 | VAL8 or VAL9 | 0-255 | 0-63 | 0-3 |

VAL8 or VAL9 = value of the code of each message
IDsp = Identifier of the source point of the command
CHANi = Number of the route concerned
RFU = Reserved for future use B/ Examples of Data Frames
T=0 for a data frame or a response to a data frame; L=0 if frame of 256 bytes of data; L=1 if frame of 64 Kbytes of data; DL=Length of data in bytes; DATA=Application data; CHANi=Routing channel number.
Frame of 255 bytes of data

| | Header | | | | |
|---|---|---|---|---|---|
| Size | 1 bit | 1 bit | 6 bits | 1 byte | 0 to 255 bytes |
| Means or contains | T | L | CHANi | DL | DATA |
| Value | 0 | 0 | 0-63 | 255 | |

Frame of 64K bytes of data

| | Header | | | | |
|---|---|---|---|---|---|
| Size | 1 bit | 1 bit | 6 bits | 2 bytes | 0 to 65535 bytes |
| Means or contains | T | L | CHANi | DL | DATA |
| Value | 0 | 1 | 0-63 | 65535 | |

Message "Acknowledgement of receipt without error"

| Size | 1 bit | 1 bit | 6 bits |
|---|---|---|---|
| Means or contains | T | No error | CHANi |
| Value | 0 | 0 | 0-63 |

Message "Reception error"

| Size | 1 bit | 1 bit | 6 bits | 1 byte |
|---|---|---|---|---|
| Means or contains | T | Error | CHANi | Code of the error |
| Value | 0 | 1 | 0-63 | 0-255 |

Annex 2 (Integral Part of the Description)—Examples of Routing Tables

TABLE 1

Example of dynamic routing table with source points located in HP1 or HP2

| | | | | IDdp | | |
|---|---|---|---|---|---|---|
| CHANi | IDsp | PTi | Mi | Send | Notify | Comments |
| 1 | ID(P1) | PT1 | M1 | ID(Pc) | ID(P2) | Processor HP1 to interface CLINT in reader mode ISOA |
| 2 | ID(P1) | PT2 | M1 | ID(Pc) | — | Processor HP1 to interface CLINT in reader mode ISOB |
| 3 | ID(P1) | PT3 | M1 | ID(Pc) | — | Processor HP1 to interface CLINT in reader mode ISO15 |
| 4 | ID(P1) | PT1 | M3 | ID(Pc) | ID(P2) | Processor HP1 to interface CLINT in device mode ISOA |
| 5 | ID(P1) | PT2 | M3 | ID(Pc) | — | Processor HP1 to interface CLINT in device mode ISOB |
| 6 | ID(P1) | PT3 | M3 | ID(Pc) | — | Processor HP1 to interface CLINT in device mode ISO15 |
| 7 | ID(P1) | — | — | ID(P2) | | Processor HP1 to SIM card (HP2) |
| 8 | ID(P2) | — | — | ID(P1) | — | SIM card (HP2) to processor HP1 |
| 9 | ID(P2) | PT1 | M1 | ID(Pc) | — | SIM card (HP2) to interface CLINT in reader mode ISOA |
| 10 | ID(P2) | PT2 | M1 | ID(Pc) | ID(P2) | SIM card (HP2) to interface CLINT in reader mode ISOB |
| 11 | ID(P2) | PT3 | M1 | ID(Pc) | ID(P2) | SIM card (HP2) to interface CLINT in reader mode ISO15 |
| 12 | ID(P2) | PT1 | M3 | ID(Pc) | — | SIM card (HP2) to interface CLINT in device mode ISOA |
| 13 | ID(P2) | PT2 | M3 | ID(Pc) | ID(P2) | SIM card (HP2) to interface CLINT in device mode ISOB |
| 14 | ID(P2) | PT3 | M3 | ID(Pc) | ID(P2) | SIM card (HP2) to interface CLINT in device mode ISO15 |

TABLE 2

Example of prestored routing table with source points located in HP1 or HP2

| | | | | | IDdp | | | |
|---|---|---|---|---|---|---|---|---|
| CHANi | IDsp | PTi | Mi | Send | Notify | Authorized | Occupied | Comments |
| 1 | ID(P1) | PT1 | M1 | ID(Pc) | ID(P2) | 1 | 1 | Processor HP1 to interface CLINT in reader mode ISOA |
| 2 | ID(P1) | PT2 | M1 | ID(Pc) | — | 0 | 0 | Processor HP1 to interface CLINT in reader mode ISOB |
| 3 | ID(P1) | PT3 | M1 | ID(Pc) | — | 0 | 0 | Processor HP1 to interface CLINT in reader mode ISO15 |
| 4 | ID(P1) | PT1 | M3 | ID(Pc) | ID(P2) | 0 | 0 | Processor HP1 to interface CLINT in device mode ISOA |
| 5 | ID(P1) | PT2 | M3 | ID(Pc) | — | 0 | 0 | Processor HP1 to interface CLINT in device mode ISOB |
| 6 | ID(P1) | PT3 | M3 | ID(Pc) | — | 0 | 0 | Processor HP1 to interface CLINT in device mode ISO15 |
| 7 | ID(P1) | — | — | ID(Pc) | | 1 | 1 | Processor HP1 to SIM card (HP2) |
| 8 | ID(P2) | — | — | ID(P1) | — | 0 | 0 | SIM card (HP2) to processor HP1 |
| 9 | ID(P2) | PT1 | M1 | ID(Pc) | — | 0 | 0 | SIM card (HP2) to interface CLINT in reader mode ISOA |
| 10 | ID(P2) | PT2 | M1 | ID(Pc) | ID(P2) | 0 | 0 | SIM card (HP2) to interface CLINT in reader mode ISOB |
| 11 | ID(P2) | PT3 | M1 | ID(Pc) | ID(P2) | 0 | 0 | SIM card (HP2) to interface CLINT in reader mode ISO15 |
| 12 | ID(P2) | PT1 | M3 | ID(Pc) | — | 1 | 1 | SIM card (HP2) to interface CLINT in device mode ISOA |
| 13 | ID(P2) | PT2 | M3 | ID(Pc) | ID(P2) | 0 | 0 | SIM card (HP2) to interface CLINT in device mode ISOB |
| 14 | ID(P2) | PT3 | M3 | ID(Pc) | ID(P2) | 0 | 0 | SIM card (HP2) to interface CLINT in device mode ISO15 |

TABLE 3

Example of static routing table for incoming data routing

| CHANi | IDsp | PTi | Mi | Send | Occupied | Comments |
|---|---|---|---|---|---|---|
| 40 | ID(Pc) | PT1 | M1 | ID(Pi(HP1)) | | Interface CLINT in reader mode ISO A to point "Pi" of HP1 |
| 41 | ID(Pc) | PT2 | M1 | ID(Pi(HP1)) | | Interface CLINT in reader mode ISO B to point "Pi" of HP1 |
| 42 | ID(Pc) | PT3 | M1 | ID(Pi(HP1)) | | Interface CLINT in reader mode ISO 15693 to point "Pi" of HP1 |
| 43 | ID(Pc) | PT1 | M2 | ID(Pi(HP1)) | | Interface CLINT in emulation mode ISO A to point "Pi" of HP1 |
| 44 | ID(Pc) | PT2 | M2 | ID(Pi(HP1)) | | Interface CLINT in emulation mode ISO B to point "Pi" of HP1 |
| 45 | ID(Pc) | PT3 | M2 | ID(Pi(HP1)) | | Interface CLINT in emulation mode ISO 15693 to point "Pi" of HP1 |
| 46 | ID(Pc) | PT1 | M3 | ID(Pi(HP1)) | | Interface CLINT in device mode ISO A to point "Pi" of HP1 |
| 47 | ID(Pc) | PT2 | M3 | ID(Pi(HP1)) | | Interface CLINT in device mode ISO B to point "Pi" of HP1 |
| 48 | ID(Pc) | PT3 | M3 | ID(Pi(HP1)) | | Interface CLINT in device mode ISO 15693 to point "Pi" of HP1 |
| 49 | ID(Pc) | PT1 | M1 | ID(Pi(HP3)) | | Interface CLINT in reader mode ISO A to point "Pi" of HP3 |
| 50 | ID(Pc) | PT2 | M1 | ID(Pi(HP3)) | | Interface CLINT in reader mode ISO B to point "Pi" of HP3 |
| 51 | ID(Pc) | PT3 | M1 | ID(Pi(HP3)) | | Interface CLINT in reader mode ISO 15693 to point "Pi" of HP3 |
| 52 | ID(Pc) | PT1 | M2 | ID(Pi(HP3)) | | Interface CLINT in emulation mode ISO A to point "Pi" of HP3 |
| 53 | ID(Pc) | PT2 | M2 | ID(Pi(HP3)) | | Interface CLINT in emulation mode ISO B to point "Pi" of HP3 |
| 54 | ID(Pc) | PT3 | M2 | ID(Pi(HP3)) | | Interface CLINT in emulation mode ISO 15693 to point "Pi" of HP3 |
| 55 | ID(Pc) | PT1 | M3 | ID(Pi(HP3)) | | Interface CLINT in device mode ISO A to point "Pi" of HP3 |
| 56 | ID(Pc) | PT2 | M3 | ID(Pi(HP3)) | | Interface CLINT in device mode ISO B to point "Pi" of HP3 |
| 57 | ID(Pc) | PT3 | M3 | ID(Pi(HP3)) | | Interface CLINT in device mode ISO 15693 to point "Pi" of HP3 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method for routing incoming or outgoing application data in a Near Field Communication (NFC) system comprising:
   an NFC interface circuit performing contactless data sending and receiving;
   an NFC controller coupled to the NFC interface circuit; and
   at least a first and a second host processor coupled to the NFC controller, each of the first and second host processors configured to execute NFC applications and to process incoming application data received through the NFC interface circuit, or to supply outgoing application data to be sent through the NFC interface circuit, wherein
   the routing of incoming application data received by the NFC interface circuit comprises:
   conveying at least a first portion of incoming application data to a first destination point located in the first host processor and designated as an arbitration point for the routing of incoming application data;
   designating by the arbitration point a destination and processing point for the application data, the destination and processing point being located in the first or second host processor; and
   if the destination and processing point is located in the second host processor, conveying a second portion of the incoming application data to the destination and processing point and conveying outgoing application data sent by the destination and processing point to the NFC interface circuit.

2. The method according to claim 1, wherein the first portion of the incoming application data is also conveyed to the destination and processing point.

3. The method according to claim 1, wherein designating a destination and processing point for the application data includes extraction of an application identifier present in the data.

4. The method according to claim 1, wherein designating a destination and processing point for the application data includes analyzing operating parameters of the NFC interface circuit.

5. The method according to claim 4, wherein the operating parameters include at least one of an operating mode of the interface circuit and a contactless data transmission protocol in which the incoming data is received.

6. The method according to claim 1, wherein the routing of the first portion of the incoming application data to the arbitration point, the routing of the second portion of the incoming application data to the destination and processing point, and the routing of the outgoing application data sent by the destination and processing point to the NFC interface circuit are performed by a routing element different from the arbitration point.

7. The method according to claim 1, wherein the arbitration point is located in a secure host processor of the NFC system.

8. The method according to claim 7, wherein the host processor in which the arbitration point is located is an integrated circuit of a Subscriber Identity Module (SIM) card.

9. The method according to claim 1, further comprising authenticating the host processor in which the destination and processing point is located, and refusing to convey the second portion of the incoming application data to the destination and processing point if the host processor has not been validly authenticated.

10. The method according to claim 9, wherein the authenticating of the host processor in which the destination and processing point is located includes checking a certificate presented by the host processor.

11. The method according to claim 1, wherein the arbitration point designates the destination and processing point of the application data by addressing to a routing element a routing command triggering the opening of a bi-directional routing channel between the NFC interface circuit and the destination and processing point.

12. The method according to claim 1, wherein the application data is conveyed within the NFC system through a routing channel defined by a routing channel number and associated routing parameters including at least one identifier of a source point and one identifier of a destination point, and is encapsulated in a frame having a header field including the routing channel number.

13. The method according to claim 12, wherein the interface circuit is configurable according to a predetermined number of operating modes and according to a predetermined number of contactless communication protocols, and the routing parameters associated to the routing channel number include an operating mode parameter and a communication protocol parameter of the interface circuit.

14. The method according to claim 12, wherein a routing channel is managed by a routing table associating the routing parameters with the routing channel number.

15. A Near Field Communication (NFC) system comprising:
an NFC interface circuit performing contactless data sending and receiving;
an NFC controller coupled to the NFC interface circuit; and
at least a first and a second host processor coupled to the NFC controller, each of the first and second host processors configured to execute NFC applications and to process incoming application data received through the NFC interface circuit, or to supply outgoing application data to be sent through the NFC interface circuit, wherein
the NFC controller is configured to convey at least a first portion of incoming application data to a first destination point located in the first host processor and designated as an arbitration point of the routing of incoming application data, and the arbitration point is configured to:
identify an application for which the data is sent to the NFC system, and
designate a destination and processing point for the application data, the destination and processing point being located in the first or second host processor, and
the NFC controller is further configured to, if the destination and processing point is located in the second host processor, convey a second portion of the incoming application data to the destination and processing point.

16. The system according to claim 15, wherein the routing element is further configured to convey the first portion of the incoming application data to the destination and processing point designated by the arbitration point.

17. The system according to claim 15, wherein, to designate a destination and processing point for the application data, the arbitration point is configured to extract an application identifier present in the first portion of the incoming application data.

18. The system according to claim 15, wherein, to designate a destination and processing point for the application data, the arbitration point is configured to analyze operating parameters of the NFC interface circuit, the operating parameters including the operating mode of the interface circuit or the contactless data transmission protocol in which the incoming data are received.

19. The system according to claim 18, wherein the operating parameters include at least one of an operating mode of the interface circuit and a contactless data transmission protocol in which the incoming data is received.

20. The system according to claim 15, wherein the routing element is different from the arbitration point and is configured to perform routing of the first portion of the incoming application data to the arbitration point, routing of the second portion of the incoming application data to the destination and processing point, and routing of the outgoing application data sent by the destination and processing point to the NFC interface circuit.

21. The system according to claim 15, wherein the arbitration point is located in a secure host processor of the system.

22. The system according to claim 21, wherein the host processor in which the arbitration point is located is an integrated circuit of a Subscriber Identity Module (SIM) card.

23. The system according to claim 21, configured to authenticate the host processor in which the destination and processing point is located, and to withhold the second portion of the incoming application data from the destination and processing point if the host processor has not been validly authenticated.

24. The system according to claim 23, configured to authenticate the host processor by checking a certificate presented by the host processor.

25. The system according to claim 15, wherein the arbitration point is configured to designate the destination and processing point of the application data by addressing to the routing element a routing command triggering the opening of a bi-directional routing channel between the NFC interface circuit and the destination and processing point.

26. The system according to claim 15, wherein the application data is conveyed in a routing channel defined by a routing channel number and associated routing parameters including at least one identifier of a source point and one identifier of a destination point, are is encapsulated in a frame having a header field including the routing channel number.

27. The system according to claim 26, wherein the interface circuit is configurable according to a predetermined number of operating modes and according to a predetermined number of contactless communication protocols, and wherein the routing parameters associated with the routing channel number include an operating mode parameter and a contactless communication protocol parameter of the interface circuit.

28. The system according to claim 26, further comprising a routing table associating the routing parameters with the routing channel number.

* * * * *